(12) United States Patent
Kato

(10) Patent No.: US 7,542,154 B2
(45) Date of Patent: Jun. 2, 2009

(54) PRINT CONTROL APPARATUS, PRINT CONTROLLING METHOD, AND PROGRAM THEREFOR

(75) Inventor: Yutaka Kato, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 638 days.

(21) Appl. No.: 11/148,271

(22) Filed: Jun. 9, 2005

(65) Prior Publication Data

US 2005/0275859 A1  Dec. 15, 2005

(30) Foreign Application Priority Data

Jun. 11, 2004  (JP) ............................... 2004-174687

(51) Int. Cl.
*G06K 15/02* (2006.01)
(52) U.S. Cl. ....................... 358/1.12; 358/1.9; 358/1.15
(58) Field of Classification Search ................ 358/1.15, 358/1.1, 1.18, 1.12; 400/71, 70
See application file for complete search history.

(56) References Cited

U.S. PATENT DOCUMENTS

| | | | | |
|---|---|---|---|---|
| 5,816,715 A | * | 10/1998 | Harman et al. ................. | 400/71 |
| 6,529,289 B1 | * | 3/2003 | Konno et al. ................. | 358/1.17 |
| 6,762,853 B1 | * | 7/2004 | Takagi et al. ................. | 358/1.15 |
| 7,170,631 B2 | * | 1/2007 | Sakura ....................... | 358/1.18 |

FOREIGN PATENT DOCUMENTS

JP  2002-262006  9/2002

* cited by examiner

*Primary Examiner*—Thomas D Lee
(74) *Attorney, Agent, or Firm*—Fitzpatrick, Cella, Harper & Scinto

(57) ABSTRACT

This invention provides printer control apparatus and a print controlling method capable of executing printing efficiently. A print server conducts the steps of: acquiring various information of a printing job being executed and a printing job whose execution is reserved in the future; acquiring various information about a state of a printer; holding acquired various information; determining whether paper feed to the printer is necessary based on the held information; fixing the contents of paper feed and a timing of paper feed when it is determined that paper feed is necessary; and forming a procedure instruction showing a procedure of paper feed, and transmitting it to a work PC when a paper feed timing comes.

4 Claims, 25 Drawing Sheets

| PRINTER NAME | STATE | ADDRESS | ADMINISTRATOR | INSTALLATION LOCATION |
|---|---|---|---|---|
| HIGH-SPEED PRINTER | PRINTING | 191.191.191.1 | SATO×○ | ISLE SIDE (NORTH) |
| COLOR PRINTER | WAITING | 191.191.191.2 | YAMADA△△ | ISLE SIDE (NORTH) |
| MEDIUM-SPEED PRINTER 1 | WAITING | 191.191.191.3 | SATO×○ | ISLE SIDE (SOUTH) |
| MEDIUM-SPEED PRINTER 2 | WAITING | 191.191.191.4 | SATO×○ | ISLE SIDE (SOUTH) |
| MEDIUM-SPEED PRINTER 3 | WAITING | 191.191.191.5 | SATO×○ | WINDOW SIDE (WEST) |
| MEDIUM-SPEED PRINTER 4 | WAITING | 191.191.191.6 | SATO×○ | WINDOW SIDE (WEST) |
| .. | .. | .. | .. | .. |

FIG.8

JOB INFORMATION MANAGEMENT TABLE

| | JOB ID | DOCUMENT NAME | RECEPTION TIME | OUTPUT CASSETTE ID | NUMBER OF OUTPUT SHEETS | NUMBER OF COPIES | PAPER SIZE |
|---|---|---|---|---|---|---|---|
| 1201 | 1 | NEW PRODUCT ANNOUNCEMENT MATERIAL | 2002/03/04 10:11:12 | 1 | 10 | 100 | A3 |
| 1202 | 2 | CATALOG | 2002/03/04 15:35:52 | 2 | 50 | 20 | B5 |
| 1203 | 3 | PRINTER MANUAL | 2002/03/04 16:45:22 | 1 | 50 | 10 | A4 |
| | — | — | — | — | — | — | — |
| | — | — | — | — | — | — | — |

DEVICE INFORMATION MANAGEMENT TABLE

| CASSETTE ID | PAPER SIZE | NUMBER OF SHEETS | JOB ID | NUMBER OF OUTPUT SHEETS | STATUS | PAPER FEED | |
|---|---|---|---|---|---|---|---|
| | | | | | | CONTENTS | TIMING |
| 1 | A3 | 1880 | 1 | 120 | BEING EXECUTED | | |
| 2 | B5 | 2000 | | | | | |

DEVICE INFORMATION MANAGEMENT TABLE

| CASSETTE ID | PAPER SIZE | NUMBER OF SHEETS | JOB ID | NUMBER OF OUTPUT SHEETS | STATUS | PAPER FEED | |
|---|---|---|---|---|---|---|---|
| | | | | | | CONTENTS | TIMING |
| 1 | A3 | 1880 | 1 | 120 | BEING EXECUTED | A4 PAPER, 500 SHEETS | AFTER JOB 1 |
| | | | 3 | 0 | WAITING | | |
| 2 | B5 | 2000 | 2 | 0 | WAITING | | |

FIG.14

FEED PAPER FOLLOWING INSTRUCTIONS BELOW

PAPER FEEDING DESTINATION : PAPER FEEDER 1 OF PRINTER 1
PAPER SIZE : A 4
NUMBER OF SHEETS : 500 SHEETS

YES (Y)   NO (N)

FIG.15

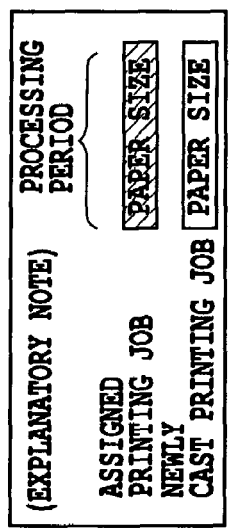
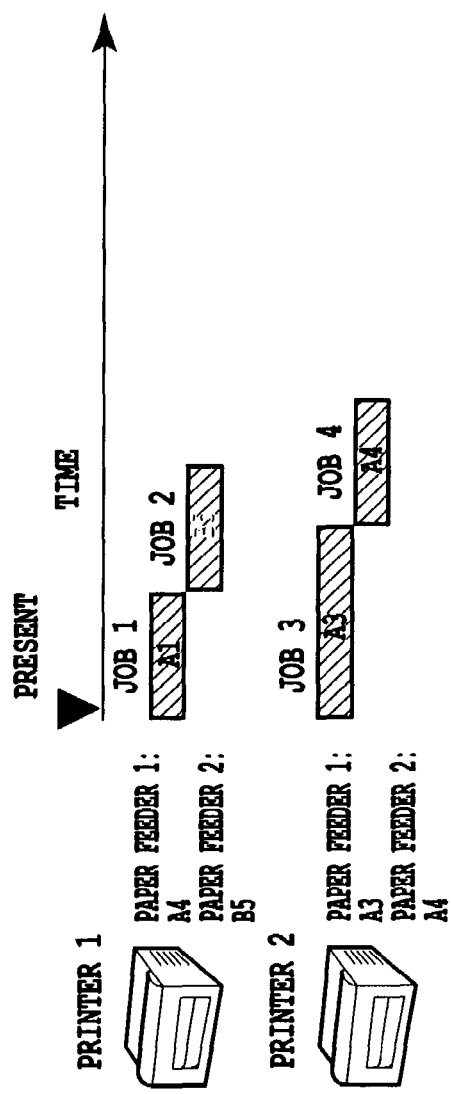
FIG.16A

JOB INFORMATION MANAGEMENT TABLE

| JOB ID | DOCUMENT NAME | RECEPTION TIME | OUTPUT DEVICE ID | OUTPUT CASSETTE ID | NUMBER OF OUTPUT SHEETS | NUMBER OF COPIES | PAPER SIZE | START TIME | COMPLETION TIME |
|---|---|---|---|---|---|---|---|---|---|
| 1 | NEW PRODUCT ANNOUNCEMENT MATERIAL | 2002/03/04 09:11:12 | 1 | 1 | 10 | 100 | A4 | 09:09:09 | 10:10:10 |
| 2 | CATALOG | 2002/03/04 09:20:00 | 1 | 2 | 50 | 20 | B5 | 10:10:10 | 11:11:11 |
| 3 | PRINTER MANUAL | 2002/03/04 09:50:17 | 2 | 1 | 50 | 10 | A3 | 08:08:08 | 10:20:30 |
| 4 | SPECIFICATION | 2002/03/04 10:00:00 | 2 | 2 | 10 | 30 | A4 | 10:20:30 | 12:12:12 |
| 5 | REPORT | 2002/03/04 10:30:30 | 1 | 1 | 30 | 20 | A3 | 11:11:11 | 13:13:13 |
| 6 | REVIEW - MATERIAL | 2002/03/04 10:20:20 | 2 | 1 | 100 | 10 | A3 | 12:12:12 | 14:14:14 |

FIG.17

DEVICE INFORMATION MANAGEMENT TABLE (PRINTER 1)

| CASSETTE ID | PAPER SIZE | NUMBER OF SHEETS | JOB ID | NUMBER OF OUTPUT SHEETS | STATUS | PAPER FEED CONTENTS | PAPER FEED TIMING |
|---|---|---|---|---|---|---|---|
| 1 | A4 | 1880 | 1 | 120 | BEING EXECUTED | | |
| | | | 5 | 0 | WAITING | A3 PAPER, 600 SHEETS | 10:10:10 - 11:11:11 |
| 2 | B5 | 2000 | 2 | 0 | WAITING | | |

FIG.18A

DEVICE INFORMATION MANAGEMENT TABLE (PRINTER 2)

| CASSETTE ID | PAPER SIZE | NUMBER OF SHEETS | JOB ID | NUMBER OF OUTPUT SHEETS | STATUS | PAPER FEED | |
|---|---|---|---|---|---|---|---|
| | | | | | | CONTENTS | TIMING |
| 1 | A3 | 400 | 3 | 200 | BEING EXECUTED | | |
| | | | 6 | 0 | WAITING | A3 PAPER, 1000 SHEETS | 10:20:30 - 12:12:12 |
| 2 | B5 | 1000 | 4 | 0 | WAITING | | |

FIG.18B

PRINT CONTROL APPARATUS, PRINT CONTROLLING METHOD, AND PROGRAM THEREFOR

BACKGROUND OF THE INVENTION

1. Field of the Invention

This invention relates to print control apparatus, a print controlling method, and a program therefor. More specifically, this invention relates to print control apparatus for executing a printing job based on a request of printing, a print controlling system, a print controlling method, and a print control program that are for the print control apparatus.

2. Description of the Related Art

Conventionally, there are commercial printers (hereinafter, referring to printing contractor) who generate printed matters on requests from customers of individual users and business enterprises. Such printing contractors run a business of receiving provision of print data (original copy) and instructions of a print format, the number of copies, a date of delivery, etc. from a customer, forming a printed matter, and delivering it to the customer. These printing contractors perform their operations using large-scale equipment, such as offset reproduction printing machines known from long ago.

Moreover, in these days, printing devices of the electrographic method (also called printers) and printers of the ink jet method are being improved for higher speed and enhanced quality of picture. In connection with this, a business form of commercial printing which is called "Copy service," "Printing service," a "Print on Demand (POD) center," etc. that is capable of outputting and delivering printed matters in a short time also exists.

A request of printing to these printing contractors is done by the user sending a manuscript written on paper or stored in an electronic medium and a print instruction on which the number of copies of the manuscript, a bookbinding method, an appointed date of delivery, etc. (an instruction on which a printing request, i.e., an order is written) by mail to the contractor providing the above-mentioned service or bringing it directly into a printing company. Electronic media includes the FD disk (floppy® disk), the MO disc (magneto-optical disc), the CD (compact disk)-ROM (read only memory), etc.

In addition, a system whereby the user gives an order of printing and sends a manuscript on line through the Internet or an intranet (a printing contractor receiving them similarly) has been put to practical use. The printing contractor accepts the request from the user, creates a print instruction, and manages scheduling for the printing job. Then, in accordance with the managed schedule, the printing contractor performs printing with a printer connected to a work computer and bookbinding, and delivers the formed printed matter to the user to complete its operations. For example, in a system "DotDoc.Web™" that sells printing services in the market, the user is requested to access a home page that the printing contractor provides from a computer of its own company, and fill necessary items, such as owner's information (destination where the printed matter is received etc.), print appearance, the number of copies. Then, by sending the form along with a manuscript file, the user can order printing of the manuscript.

Such printing contractors who execute printing jobs entrusted from users must complete printing so that the printed matters are with stable quality and in time for the appointed dates of delivery that were designated by the users. Moreover, in a large-scale printing center, a plurality of operators must process multiple printing requests (orders) in parallel sequentially using a wide variety of printers and work computers. Therefore, it is necessary to use resources of man power (operators who conduct operations), machines, etc. efficiently as much as possible.

As a more concrete problem existing on the printing contractor side, there is a problem of paper run-out that occurs randomly among a plurality of printers. With printing contractors as described above, basically the number of remaining sheets in each printer is not controlled. The operator is notified of paper run-out when it occurs, and feeds the paper as occasion requests. For this reason, the operator goes up to each printer when paper runs out and conducts paper feed, and consequently the work is very inefficient. Moreover, depending on timing, a printer is halted because of paper run-out, which refrains the operator to use a printing resource efficiently. In order to solve such a problem, for example, Japanese Patent Application Laid-open No. 2002-262006 discloses a system of predicting when paper of a specific size runs out from a use state of the printer for a certain period of past time.

However, the system disclosed by the Japanese Patent Application Laid-open No. 2002-262006, is for predicting paper run-out in a single printer, not considering such environments as "POD center" where a plurality of printers execute printing jobs in parallel. Although this system allows the operator to know a timing when paper goes short in each printer, but the number of paper feed operations for a plurality of printer is not reduced. For this reason, this system did not solve fundamentally the problem of lowering of efficiency due to randomly occurring paper run-out in the plurality of printers described above. Moreover, when paper run-out occurs with different printers almost simultaneously, depending on timings, it is often the case where the printers are halted, and the resource cannot be used efficiently. Therefore, there was still room for improvement of the conventional technology described above in a respect that a plurality of printers must execute printing jobs in parallel more efficiently.

SUMMARY OF THE INVENTION

This invention is devised in view of such problems, and has its object to provide print control apparatus capable of executing printing efficiently, a print controlling method therefor, and a program therefor.

In order to achieve these objects, according to this invention, print control apparatus that accepts information about printing jobs and manages and controls information of a plurality of accepted printing jobs comprises: job information managing means for extracting paper information necessary in performing print processing of information about the printing jobs from information about the accepted printing jobs, and registering and managing it in the job information management table; device information managing means for acquiring paper information of each sheet feeder mounted on the printer that performs print processing of information about the printing jobs, and registering and managing it in a device information management table; paper feed determining means for determining whether paper feed is necessary for the printer from information of paper necessary for each piece of information of a plurality of printing jobs that are managed in the job information management table by the job information managing means and paper information of each sheet feeder managed in the device information management table by the device information managing means; paper feed time fixing means for, when the paper feed determining means determines that paper feed is necessary, fixing paper feed times based on printing order of information about the plurality of printing jobs; paper feed time determining means for determining whether this moment is the paper feed time; and notifying means for, when the paper feed time determining means determines that this moment is the paper feed time, notifying an instruction of the paper feed.

Moreover, in order to achieve the above-mentioned object, according to this invention, the print control apparatus comprises: first storage means for storing first processing information of each printing job for each printing job; second storage means for storing information about the printer and second processing information of each printing job for each printing job that should be processed by the printer; printing job information acquiring means for accepting information about a new printing job, acquiring first processing information of the new printing job from the accepted information, and storing the acquired first processing information in the first storage means; printer information acquiring means for acquiring information of a printer and storing the acquired information of the printer in the second storage means; processing information appending means for associating second processing information of the new printing job that relates to the first processing information stored by the printing job information acquiring means with information of the printer stored by the printer information acquiring means and appending it in the second storage means; paper feed determining means for determining whether paper feed for the new printing job is necessary by comparing paper information included in first processing information of the new printing job that relates to the second processing information appended by the processing information appending means and paper information included in information of the printer that was associated with the second processing information; paper feed time fixing means for, when the paper feed determining means determines that the paper feed is necessary, fixing paper feed times so that the paper feed will be done by the start of the new printing job based on first processing information of each printing job stored in the first storage means and second processing information of each printing job stored in the second storage means and appending the fixed paper feed time into the second storage means, being included in the second processing information of the new printing job; paper feed time determining means for determining whether this moment is the paper feed time; and notifying means for, when the paper feed time determining means determined that this moment is the paper feed time, notifying an instruction of the paper feed.

Furthermore, in order to achieve the above-mentioned object, according to this invention, a print controlling method of print control apparatus that accepts information about a printing job and manages and controls information about the plurality of accepted printing jobs comprises: a job information management step of extracting paper information necessary in performing print processing of information about the printing job from information about accepted printing job, and registering and managing it in a job information management table; a device information management step of acquiring paper information of each sheet feeder mounted on a printer that performs print processing of information about the printing jobs, and registering and managing it in the device information management table; a paper feed determination step of determining whether paper feed is necessary for the printer from information of paper necessary for each piece of information about a plurality of printing jobs that are managed in the job information management table in the job information management step and paper information of each sheet feeder managed by the device information management table in the device information management step; a paper feed time fixing step of, when it is determined in the paper feed determination step that paper feed is necessary, fixing paper feed times based on printing order of information about the plurality of printing jobs; a paper feed time determination step of determining whether this moment is the paper feed time; and a notification step of, when it is determined that this moment is the paper feed time in the paper feed time determination step, notifying an instruction of the paper feed.

Furthermore, in order to achieve the above-mentioned object, according to this invention, a print controlling method of a printer that has a first storage means for storing first processing means of each printing job for each printing job, and a second storage means for storing information of the printer and second processing information of each printing job for each printing job that should be processed by the printer composes: a printing job information acquisition step of accepting information about a new printing job, acquiring first processing information of the new printing job from the accepted information, and storing the acquired first processing information in the first storage means; a printer information acquisition step of acquiring information of a printer and storing the acquired information of the printer in the second storage means; a processing information append step of associating second processing information of the new printing job that relates to the first processing information stored in the printing job information acquisition step with information of the printer stored in the printer information acquisition step, and appending it in the second storage means; a paper feed determination step of determining whether paper feed for the new printing job is necessary by comparing paper information included in first processing information of the new printing job that relates to the second processing information appended in the processing information append step and paper information included in information of the printer that is associated with the second processing information; a paper feed time fixing step of, when it is determined that the paper feed is necessary, fixing a paper feed time so that the paper feed is completed by the start of the new printing job based on first processing information of each printing job stored in the second storage means and second processing information of each printing job stored in the second storage means and appending the fixed paper feed time in the second storage means, being included in the second processing information of the new printing job; a paper feed time determination step of determining whether this moment is the paper feed time; and a notification step of, when it is determined in the paper feed time determination step that this moment is the paper feed time, notifying an instruction of the paper feed.

Furthermore, in order to achieve the above-mentioned object, according to this invention, print control apparatus that accepts information about a printing job and manages and controls information about a plurality of accepted printing jobs comprises: extraction means for extracting paper information necessary in performing print processing of information about the printing job from information about accepted printing job; acquisition means for acquiring paper information of each sheet feeder mounted on a printer that performs print processing of information about the printing jobs; paper feed determining means for determining whether the printer needs paper feed from information of paper necessary in performing print processing of information about a printing job extracted by the extraction means and paper information of each sheet feeder acquired by the acquisition means; paper feed time fixing means for, when the paper feed determining means determines that paper feed is necessary, fixing paper feed times based on printing order of information about the printing job; paper feed time determining means for determining whether this moment is the paper feed time; and notification means for, when the paper feed time determining means determines that this moment is the paper feed time, notifying an instruction of the paper feed.

Furthermore, in order to achieve the above-mentioned object, according to this invention, a print controlling method where information about a printing job is accepted and information about a plurality of accepted printing jobs is processed comprises: an extraction step of extracting paper information necessary in performing print processing of information about the printing job from information about the accepted printing job; an acquisition step of acquiring paper information of each sheet feeder mounted on a printer that performs print processing of information about the printing jobs; a paper feed determination step of determining whether the printer needs paper feed from information of paper necessary in performing print processing of information about a printing job extracted by the extraction step and paper information of each sheet feeder acquired by the acquisition step; a paper feed time fixing step of, when it is determined by the paper feed determination step that paper feed is necessary, fixing paper feed times based on printing order of information about the printing jobs; a paper feed determination step of determining whether this moment is the paper feed time; and the notification step of, when it is determined that this moment is the paper feed time, notifying an instruction of the paper feed.

The above configuration of this invention allows management of remaining sheets of a plurality of printers and management of a progress of a plurality of printing jobs that are reserved to be executed in the future for the printers. The object of this invention is that by this management, the operator is notified and instructed of the most efficient paper feed time and paper feed procedure such that a waiting time of the printer due to paper run-out is eliminated and saves the operator' time, whereby the above-mentioned problem is solved. Moreover, even in the case where a plurality of printers are not used, the above configuration of this invention is effective provided that a printer is equipped with a plurality of sheet feeders (cassettes).

This invention effects a result that paper run-out of the printer is decreased and printing can be executed efficiently without halting printing job.

The above and other objects, effects, features and advantages of the present invention will become more apparent from the following description of embodiments thereof taken in conjunction with the accompanying drawings.

BRIEF DESCRIPTION OF THE DRAWINGS

FIG. 8 is a diagram illustrating a GUI of a device manager of Embodiments 1, 2 to which this invention can be applied;

FIG. 12 is a diagram showing an example of the configuration of a job information management table of Embodiment 1 to which this invention can be applied;

FIG. 13 is a diagram showing an example of the configuration of a device information management table of Embodiment 1 to which this invention can be applied;

FIG. 14 is a diagram showing an example of the configuration of the device information management table of Embodiment 1 to which this invention can be applied;

FIG. 15 is a view illustrating a paper feed procedures manual displayed on a working PC of Embodiment 1 to which this invention can be applied;

FIGS. 16A to 16D are schematic diagrams for explaining briefly Embodiment 2 to which this invention can be applied;

FIG. 17 is a diagram for explaining an example of the configuration of the job information management table of Embodiment 2 to which this invention can be applied;

FIGS. 18A and 18B are diagrams showing examples of the configuration of the device information management table of Embodiment 2 to which this invention can be applied.

DETAILED DESCRIPTION OF PREFERRED EMBODIMENTS

Figure 1:
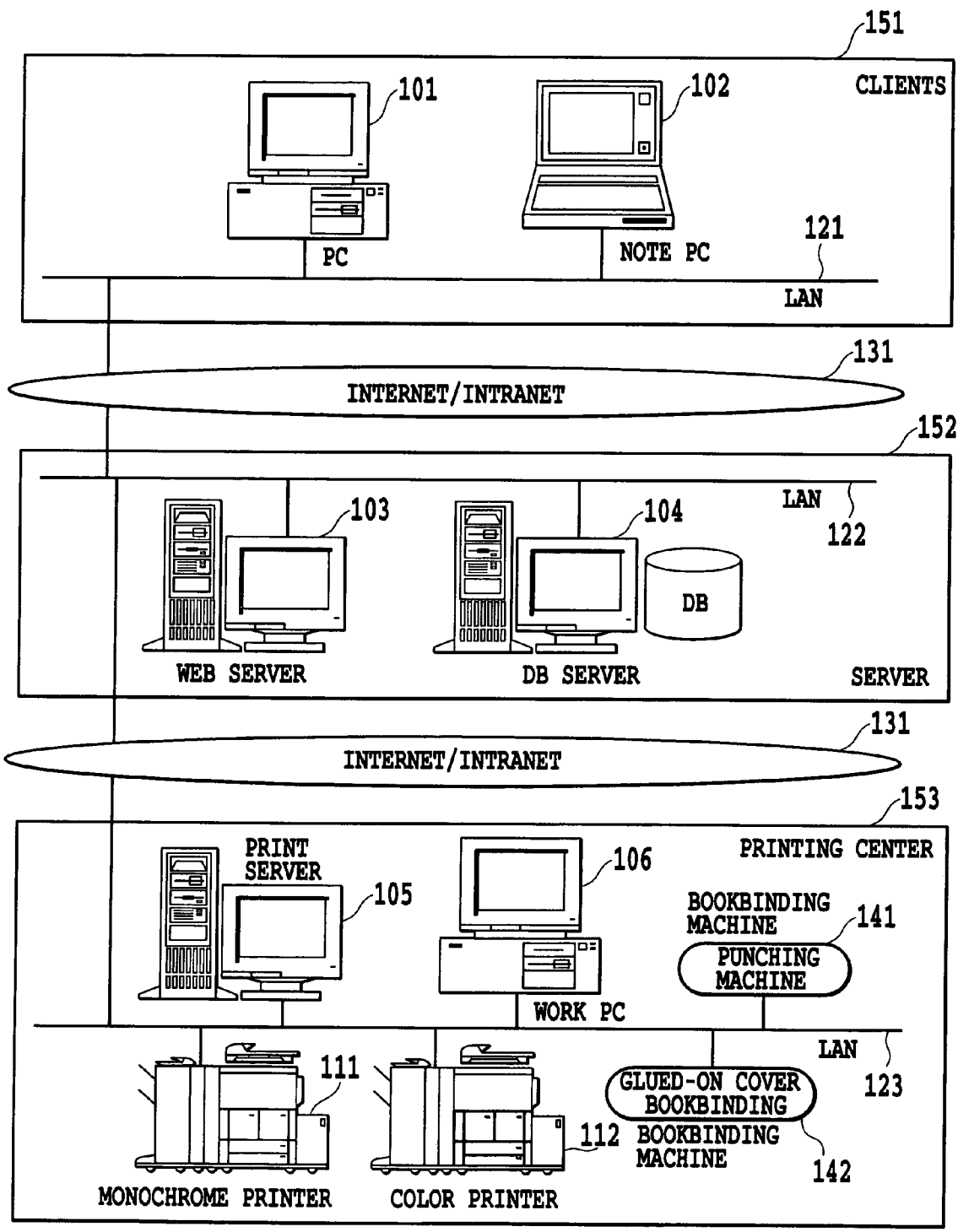
FIG. 1 is a diagram showing the overall configuration of a printing system of Embodiments 1, 2 to which this invention can be applied.

Hereafter, embodiments to which this invention can be applied will be described in detail referring to the drawings. Incidentally, parts having the similar functions are designated with the same reference numerals in each figure, and repeated explanation thereof will be omitted.

Embodiment 1

(Equipment Configuration)

FIG. 1 is a diagram showing the overall configuration of a printing system of this Embodiment 1. Note that environments of the whole printing system in the description below is for making the explanation of Embodiment 1 easy to understand, and this invention is not limited by these environments.

In FIG. 1, clients 151 show clients including a note PC (Personal Computer) 102 that is in his/her home of an common user and connected to the Internet and a business PC 101 disposed in a company and connected to in-house intranet.

A server 152 shows an WEB server 103, a DB (database) server 104, etc disposed in the company. The WEB server 103 is a computer system for providing a contents frame to be sent in a printing office in which the user inputs a print request or manuscript. The DB server 104 is a computer system for storing an inputted print request as an indenture (order card) and storing a manuscript that was sent in electronically. Here, although it is possible to dispose the WEB server and the DB server in a single case, a description will be given for a case where the two servers are disposed in two cases for convenience in this embodiment.

A plurality of printing centers 153 can exist for the server 152. Printers of each printing center 153 are linked to the servers 152 independently based on information of these printers. The printing center 153 collects periodically an order card and its manuscript stored in the server 152 through the DB server 104. In the print server 153, there are disposed a print server 105, one or more work PCs 106, and a monochrome printer 111 and a color printer 112 serving as actual output destinations, in addition to a bookbinding machine 141 (punching machine) and a bookbinding machine 142 (glued-on cover bookbinding machine) that are used for offline bookbinding after printing. The print server 105 is a computer system for providing various services of the printing system pertinent to this invention. The work PC 106 provides a function that allows the user to operate various services provided by the print server 105 through an easy-to-use GUI (Graphical User Interface). It is needless to say that the configuration of the printing center and its environment are not limited to what is described above.

In the example of this Embodiment 1, network connection is established by the Internet/Intranet 131 between the client 151 and the server 152, and between the server 152 and the printing center 153. Usually, the client 151 and the server 152 are often connected together by the Internet, and the server 152 and the printing center 153 are connected by the Intranet using dedicated line. However, this Embodiment 1 is not limited to such environments, but can also be applied to an environment where the server 152 exists in the printing center 153.

General browser to read sent-in contents that the WEB server 103 provides is installed in the note PC 102 and the PC 101 that are the clients 151. Moreover, the note PC 102 and the PC 101 can upload manuscript data using the sent-in contents.

The WEB server 103 is an WEB server for providing the above-mentioned send-in contents. The send-in content form has an edit control for inputting print appearance, such as bookbinding, a printing setting, such as the number of copies and paper size, an appointed date of delivery, information of the purchaser, deliver destination, etc., and a file specification control for specifying a file of the manuscript data to be uploaded. Here, charge calculation according to the inputted request contents, fixation of entered items, etc. are carried out by a service module operating on the WEB server 103. Since it is a general logic, detailed explanation of it will be omitted. Moreover, the WEB server 103 stores the indenture (here the contents of a print request and a file name of the manuscript data are written) on which a fixed print request is recorded and a manuscript data file in the DB server 104.

A general database management system is installed in the DB server 104, and can send a desired indenture and manuscript data upon a data acquisition demand from the print server 105 that will be described later. An unillustrated DB schema consists mainly of tables of a printing center master, a device master, a bookbinding machine master, etc. The printing center master has information of locations, contact destinations, etc., the device master, and the bookbinding machine master as its members. The device master consists of device configuration information of color/monochrome, the number of printed sheets, options, etc. The bookbinding machine master is information of a glued-on cover bookbinding machine, a punching machine, etc. By referring to the tables of this DB schema, the DB server 104 enables the print server 105 existing in the printing center 153 to receive an order assigned to its home printing center.

Print server software to be described later operates in the print server 105. The print server software is notified of order fixation from the WEB server 103, collects an indenture and its manuscript data file from the DB server 104, and performs processing according to the collected indenture. The print server software consists of later-described functions:

Order manager
Job manager
Device scheduler
Device manager, etc.

An operator can display a menu screen (not illustrated) of a viewer (software for data display) of print server software on the work PC 106, select one or more functions described above on the menu screen using a pointing device etc., and start the selected functions.

The work PC 106 is a console that controls various services provided by the print server 105 using the GUI. More specifically, the work PC 106 is a computer that takes out a manuscript data file stored in the print server 105, starts a predetermined application, fixes up print appearance, and performs printing based on a specified print setting. A viewer that communicates with the print server software, performs display based on the information, and enables the user to make an instruction to the print server software of the print server 105 is installed in the work PC 106. A form of the viewer is not particularly specified. A construction of well-known data display software, such as a general browser for browsing the contents, can be applied to it.

Installation and configuration of the monochrome printer 111 and the color printer 112 may be different depending on the printing center 153. Generally, installation of printers is often composed of a high-speed monochrome printer and a high-quality color printer. All the printers are scheduled by a device scheduler of the print server 105.

The bookbinding machines 141, 142 are off-line bookbinding machines for binding paper outputted from the printers, being a punching machine and a glued-on cover bookbinding machine, respectively. However, other bookbinding machine, such as a stapler and a ring bookbinding machine, can be used for the bookbinding machines 141, 142. By connecting the bookbinding machines 141, 142 to a network, their condition statuses can be collected. Moreover, as with the printers, the bookbinding machines 141, 142 may have different installation and configuration depending on the printing center 153.

Figure 2:
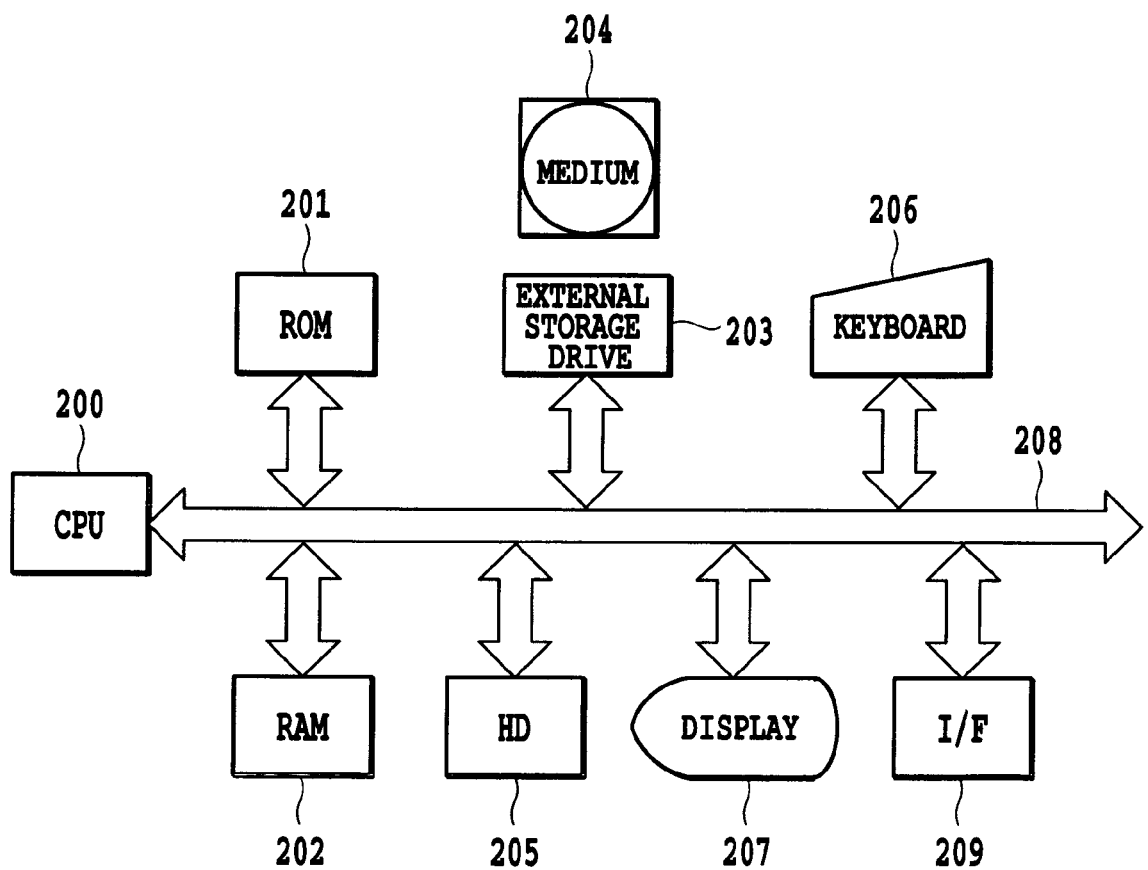
FIG. 2 is a block diagram showing an outline configuration of hardware of a computer of Embodiments 1, 2 to which this invention can be applied.

FIG. 2 is a block diagram showing an outline configuration of software of a computer that is applicable to the print server 105. Hereafter, with reference to FIG. 2, a hardware configuration of the print server 105 for providing various services of a printing system of this Embodiment 1 will be explained.

A CPU (central processing®) 200 executes application programs, printer driver programs, an OS (operating system), network printer control programs, etc. that are stored in a HD (hard disk) 205. The CPU 200 controls temporal storage of information, files, etc. necessary in executing programs in RAM (Random access memory) 202. ROM (read only memory) 201 stores programs of a basic I/O (input-output) program etc. and various data of font data, templates, etc. used in processing documents. The RAM 202 functions as a main memory, a work area, etc. of the CPU 200.

Figure 4:
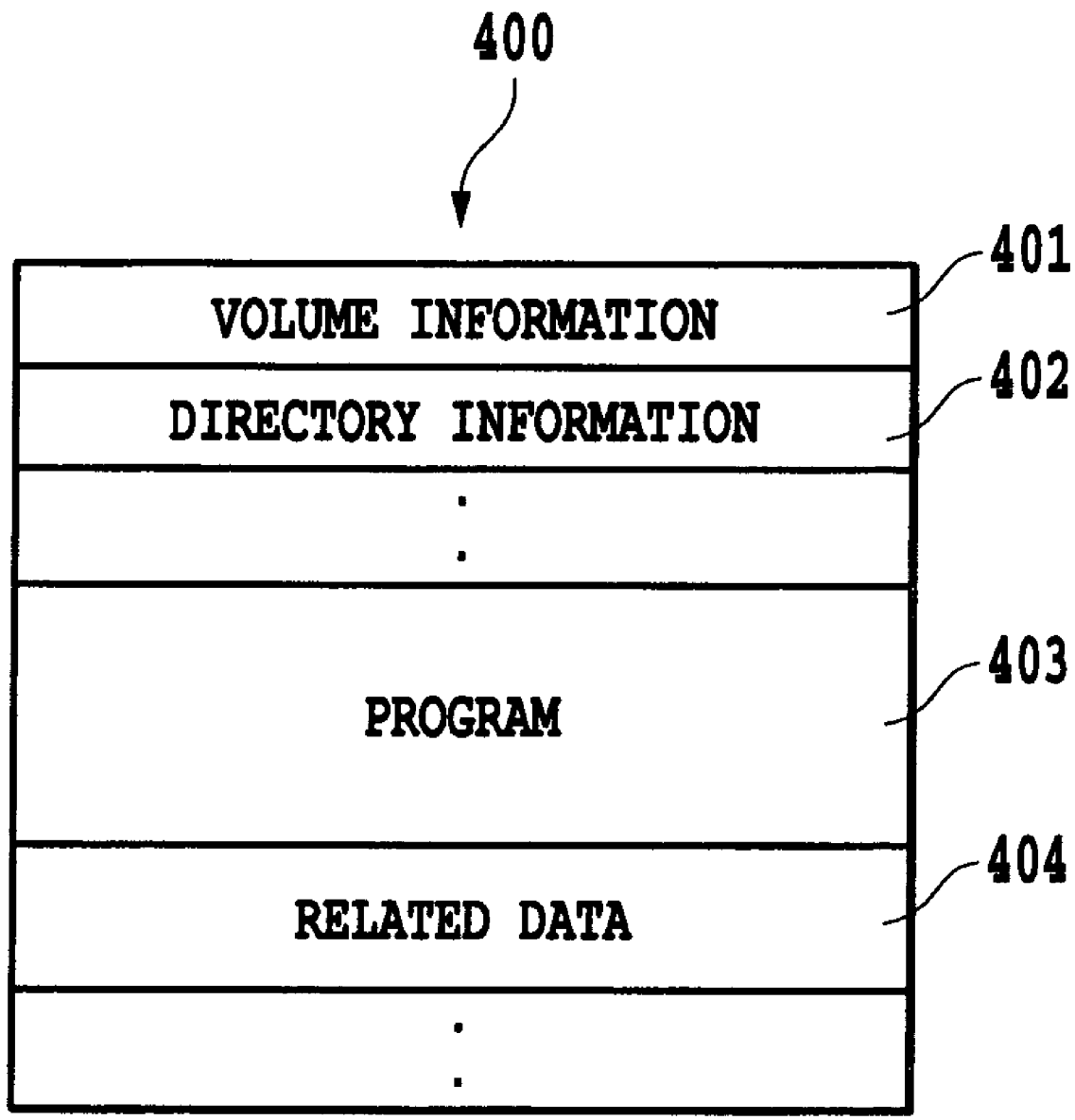
FIG. 4 is a composition diagram of the contents stored in a medium of Embodiments 1, 2 to which this invention can be applied.

An external storage drive 203 can load programs etc. stored in a medium 204 into the print server 105. The medium 204 stores programs and related data of the print server software that will be described later. FIG. 4 shows a composition of the stored contents (to be described later). The HD 205 stores the application programs, the printer driver programs, the OS, the control programs, their related programs, etc., and also can store various data.

A keyboard 206 is a tool wherewith the operator enters and directs instructions of control commands of devices and the like to the computer. The operator can enter a command and information into the computer through a pointing device (not illustrated) or through other input devices, such as a microphone, (not illustrated) except for the keyboard 206. These input devices are often connected to the CPU 200 through a serial port interface (not illustrated) combined to a system bus 208. Alternatively, the input device may be connected thereto through other interfaces, such as a parallel port and a USB (Universal Serial Bus).

A display 207 displays a command entered from the keyboard 206, states of printers, etc. The system bus 208 plays a role in control of data flows in the computer. A network interface (hereinafter, referred to as I/F) 209 is a communication interface for establishing connection with a local area network (LAN) or the Internet. Incidentally, the configuration shown in FIG. 2 can be applied to other computers of the WEB server 103, the DB server 104, the work PC 106, etc. except for description related to the print server software.

Figure 3:
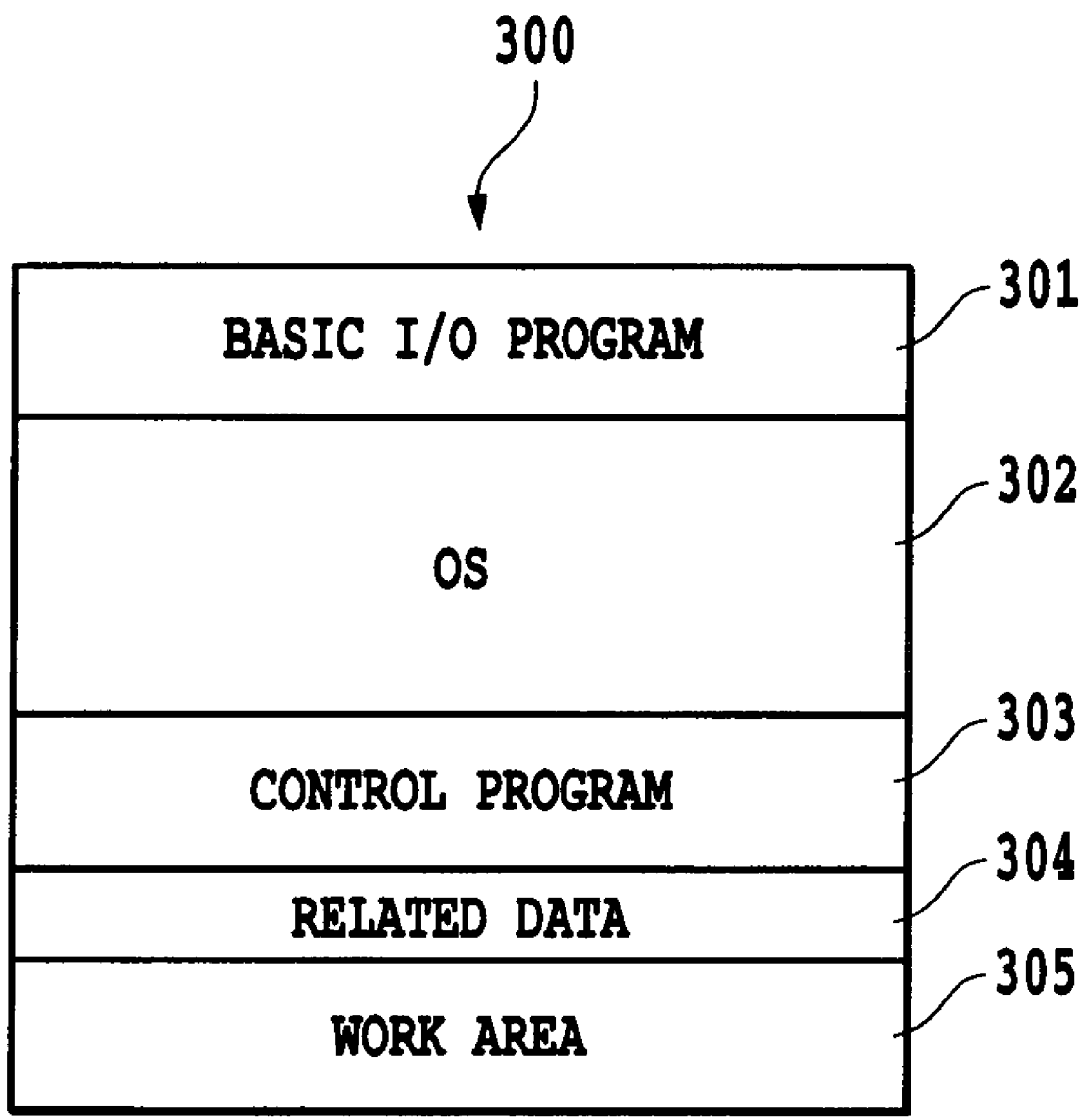
FIG. 3 is a diagram showing a memory map when a program of print server software of Embodiments 1, 2 to which this invention can be applied is loaded onto RAM and becomes executable.

FIG. 3 is a diagram showing a memory map when a program of the print server, to be described later, of this Embodiment 1 is installed into the RAM 202, becoming executable. This Embodiment 1 shows an example where a program and related data are directly installed into the RAM 202 from the medium 204 and made to be executed. Alternatively, a scheme other than this may be adopted, i.e., each time a program of this Embodiment 1 is operated from the medium 204, a necessary program etc. is loaded into the RAM 202 from the HD 205. Moreover, the medium 204 that stores a program of the print server software of this Embodiment 1 may be any of a FD (Floppy®), a CD (Compact disk)-ROM, a DVD (digital versatile disk), IC (integrated circuits), a memory card, etc.

Furthermore, it is also possible to store the program of the print server software of this Embodiment 1 in the ROM 201. The ROM 201 is configured so as to constitute a part of a memory map and allows the CPU 200 to execute it directly. The numeral 301 in the figure indicates the basic I/O program. This is a program that has an IPL (initial program loading) function that makes it possible to read the OS into the RAM 202 from the HD 205 and start operations of the OS, and other functions. Furthermore, an OS 302, a control program 303, and related data 304 are expanded onto the RAM 202, respectively. A work area 305 where the CPU 200 executes the program of the print server software of this Embodiment 1 is allocated in the RAM 202.

Next, in FIG. 4, the numeral 400 in the figure is data contents of the medium 204. The numeral 401 is volume information indicating data information, the numeral 402 is directory information, the numeral 403 is the program of the print server software of this Embodiment 1, and the numeral 404 is data related thereto.

(Explanation of Operation)

In the system configuration described above, operation contents of the printing system of this Embodiment 1 will be described below with reference to FIGS. 5 to 19B in addition to FIGS. 1 to 4 described above.

Figure 5:
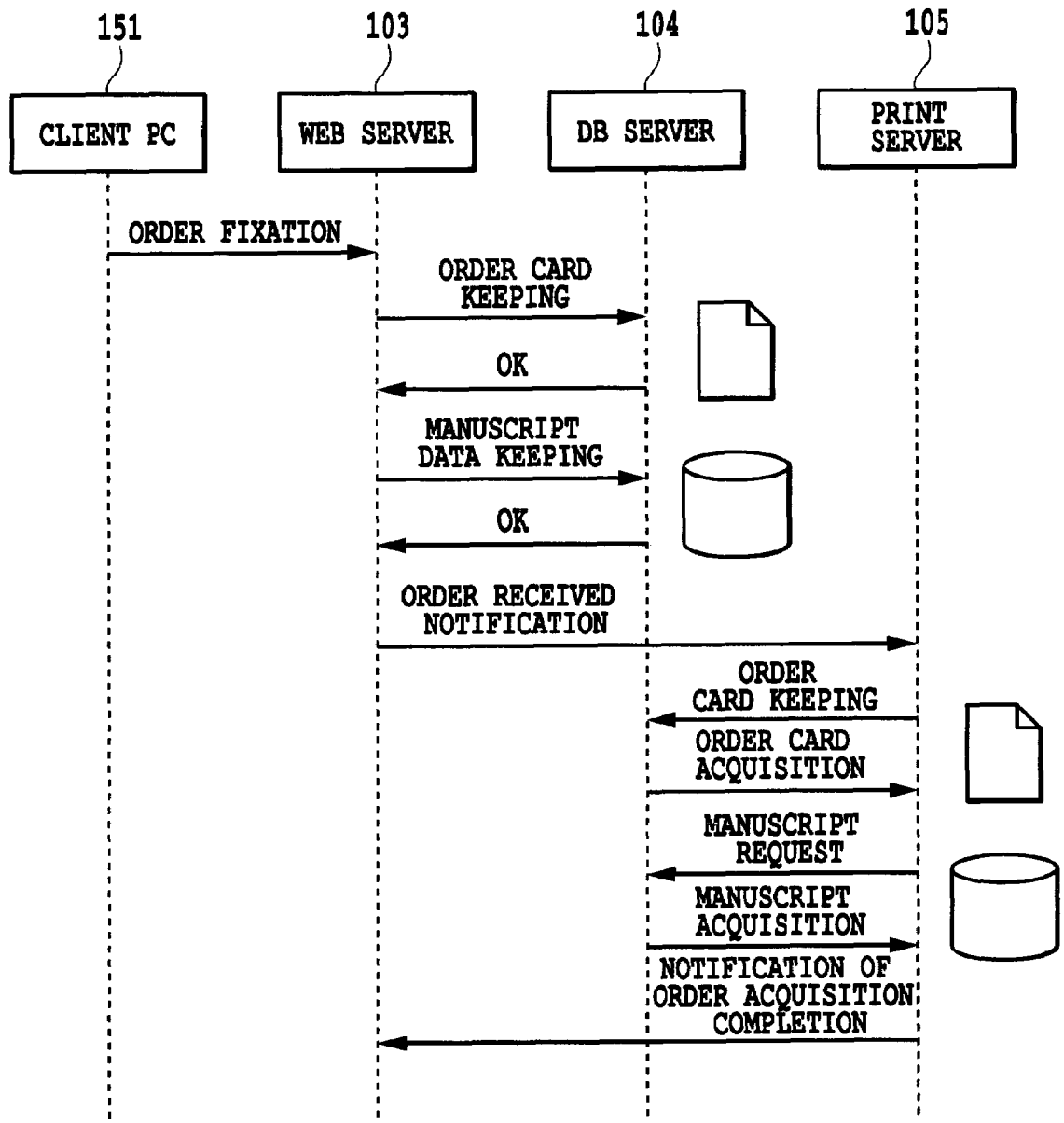
FIG. 5 is a sequence diagram showing the flow of information of an order of Embodiments 1, 2 to which this invention can be applied.

FIG. 5 is a sequence diagram showing a flow of information of an order from printing order fixation to order completion of this Embodiment 1. When order contents entered from the client 151 are fixed, an indenture is created in the WEB server 103 and stored in the DB server 104. Similarly, when the client 151 uploads manuscript data, the manuscript data will be stored in the DB server 104. When these pieces of storage processing are completed, the WEB server 103 notifies the print server 105 in the printing center of acknowledgement of the order. Upon reception of this, the print server 105 acquires an indenture from the DB server 104.

Furthermore, in the case where the manuscript data is uploaded, the print server 105 acquires a manuscript data file from the DB server 104 similarly. When acquisition of them is completed, the print server 105 transmits a notification of order acquisition completion to the WEB server 103. Through this series of processing steps, the server 152 and the printing center 153 synchronize with each other. At the same time with this, it becomes possible to distribute a load of the whole system: order acknowledgement processing is done by the server 152 and the print processing is done by the printing center 153.

Figure 6:
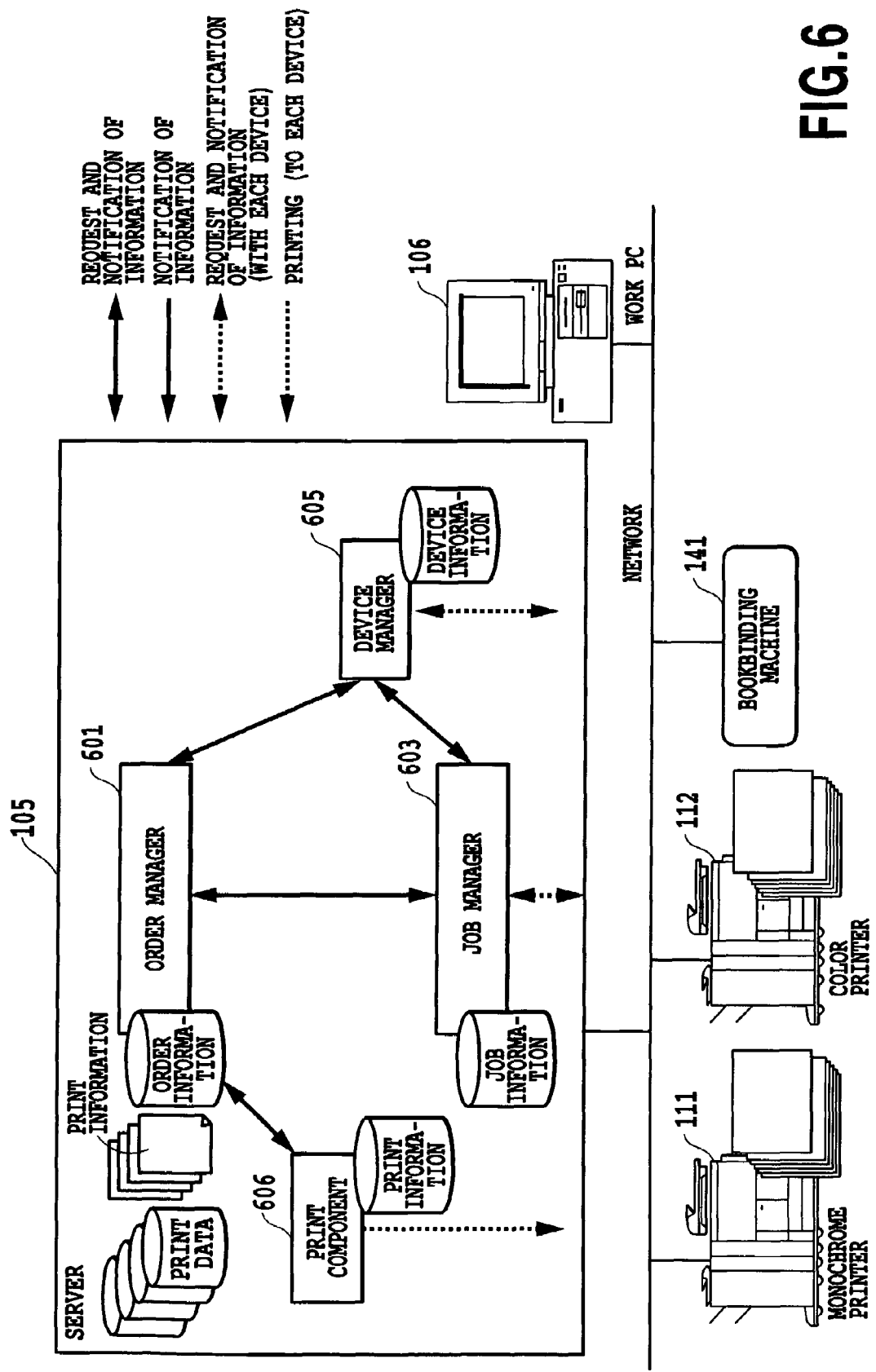
FIG. 6 is a configuration diagram showing the configuration of print server software with function modules of Embodiments 1, 2 to which this invention can be applied.

FIG. 6 is a block diagram showing the configuration of the print server software executed by the CPU 200 of the print server 105 as composed of functional modules. The numeral 601 in the figure is an order manager that is a module for managing sent-in orders. When being started from the viewers of the work PC 106 and the print server 105, it displays an unillustrated GUI on their displays. When the order manager 601 detects send-in of an indenture (order card) and its manuscript data file from the DB server 104 and the WEB server 103 described above, it collects them and stores the manuscript data file in the HD 205 of the print server 105 as print data. The order manager 601 extracts print information from the indenture. Next, the order manager 601 combines the information with a path name of storage destination of the manuscript data file (print data), appends these pieces of information with an order ID of the order, which is order information necessary for printing, and registers it in the order information table. Then the order manager 601 stores the table in the HD 205 of the print server 105.

The GUI of the order manager 601 is equipped with a list display screen in which an outline state of orders is shown based on theses pieces of order information and a tag display screen in which detailed information of the order is shown. The operator can confirm a progress of the order by seeing this GUI. Further, the order manager 601 uploads the same order information to the WEB server 103 whenever need arises at the timing of status alteration. By this, the WEB server 103 can provide the similar information to the user using HTML (Hyper Text Markup Language) on a processing state content screen not illustrated. Although this order information is kept until printing is completed and a printed matter is delivered, it will be eliminated after delivery for confidentiality reason.

When performing print processing, the operator specifies an order ID from the menu screen of the viewer of the print server software on the work PC 106, and starts a print component 602.

The print component 602 acquires order information corresponding to the specified order that is registered in the order information table from the order manager 601. Then the print component 602 downloads print data and print information based on the order information to the work PC 106. The operator checks the print data and the print information on the work PC 106, instructs printing of the order corresponding to an appropriate order, and starts printing.

When printing is started, the work PC 106 issues a new print processing instruction that has print information etc. of the specified order to a job manager 603 that is software for managing printing jobs. The job manager 603 communicates with the monochrome printer 111, the color printer 112, etc., and registers information, such as the status, corresponding to the printing job of the print processing instruction in the job information management table. The job manager 603 stores the table in the HD 205 of the print server 105 and performs management and monitoring of the printing job.

Figure 7:
FIG. 7 is a diagram illustrating a GUI of a job manager of Embodiments 1, 2 to which this invention can be applied.

FIG. 7 is a diagram illustrating a GUI of the job manager 603 in FIG. 6. As shown in the numeral 701 in FIG. 7, the job manager 603 displays information of the printing job whose condition changes at any time. Along with this, the job manager 603 enables the operator to control an arbitrary printing job. That is, the operator makes the work PC 106 display the GUI of the job manager 603 as shown in FIG. 7, and checks a document name given to the print data, a status of the printing job (being outputted, waiting for output, being halted, etc.), a time when the printing job is accepted, etc. as required. Moreover, the operator performs selection of an arbitrary jobs as the numeral 702, status alteration (printing stop, printing halt, continue to print, etc.), etc. using a pointing device etc.

Figure 9:
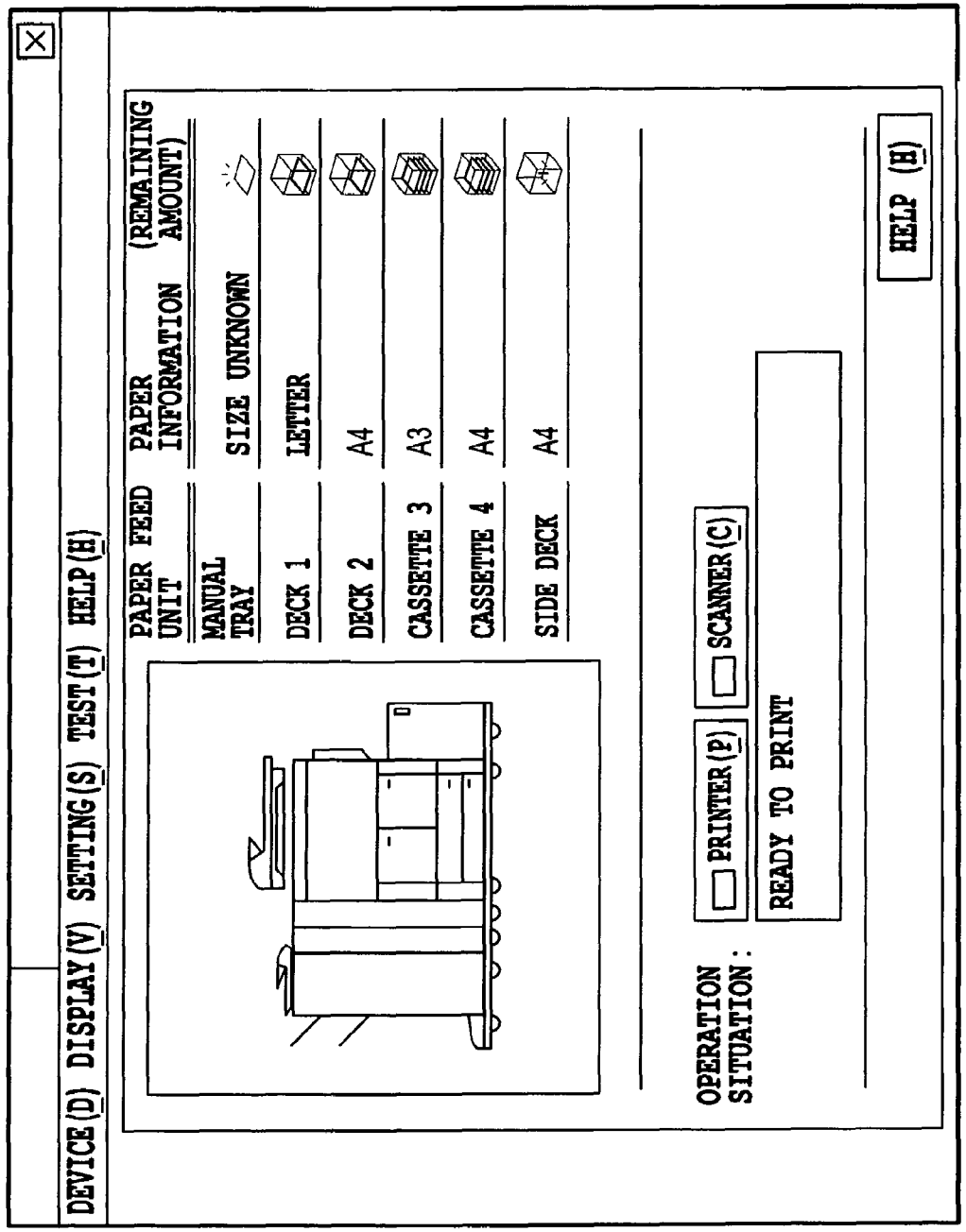
FIG. 9 is a diagram illustrating a GUI of the device manager of Embodiments 1, 2 to which this invention can be applied.

FIG. 8 and FIG. 9 are diagrams illustrating GUIs of a device manager 604 in FIG. 6. FIG. 8 is one example of a GUI of the device manager 604 that displays a list of installation information of printers. FIG. 9 is one example of a GUI of the device manager 604 that displays a setting of an arbitrary printer. The operator displays a GUI of the device manager 604, as shown in FIGS. 8 and 9, on the work PC 106 and checks information of a printer as required.

The device manager 604 is software that refers to a device information table (not illustrated) in which installation information (network address, administrator) of printers is recorded and manages devices (printers) used for various print processing. The device manager 604 communicates with printers periodically, acquires their statuses (operation conditions, error/warning occurring conditions), updates the device information table, and stores the table in the HD 205 of the print server 105. The device manager 604 displays the GUIs of FIGS. 8 and 9 based on the information of this device information table.

Moreover, the device manager 604 communicates with printers periodically, acquires device information of capacity information of the printers and supply articles, and keeps them in the device information table. The capacity information of a printer includes information of a processing speed per unit time, finishing functions, such as bookbinding/stapling/punching/etc. and the like. The supply article information includes information of paper/toner/staple/etc. FIG. 9 is one example in which supply article information (paper) is displayed. Moreover, the device manager 604 has a function of notifying device information in response to a demand from the order manager 601 and the job manager 603.

Hereafter, for a single printer equipped with a plurality of sheet feeders, a description will be given for processing in which the job manager 603 and the device manager 604, in cooperation with each other, fix and notify a paper feed procedure for a printer and its timing. The processing in connection with explanation of operations of this Embodiment 1 is conducted by the processing procedure as in a flowchart and tables in FIGS. 10 to 14.

Figure 10A:
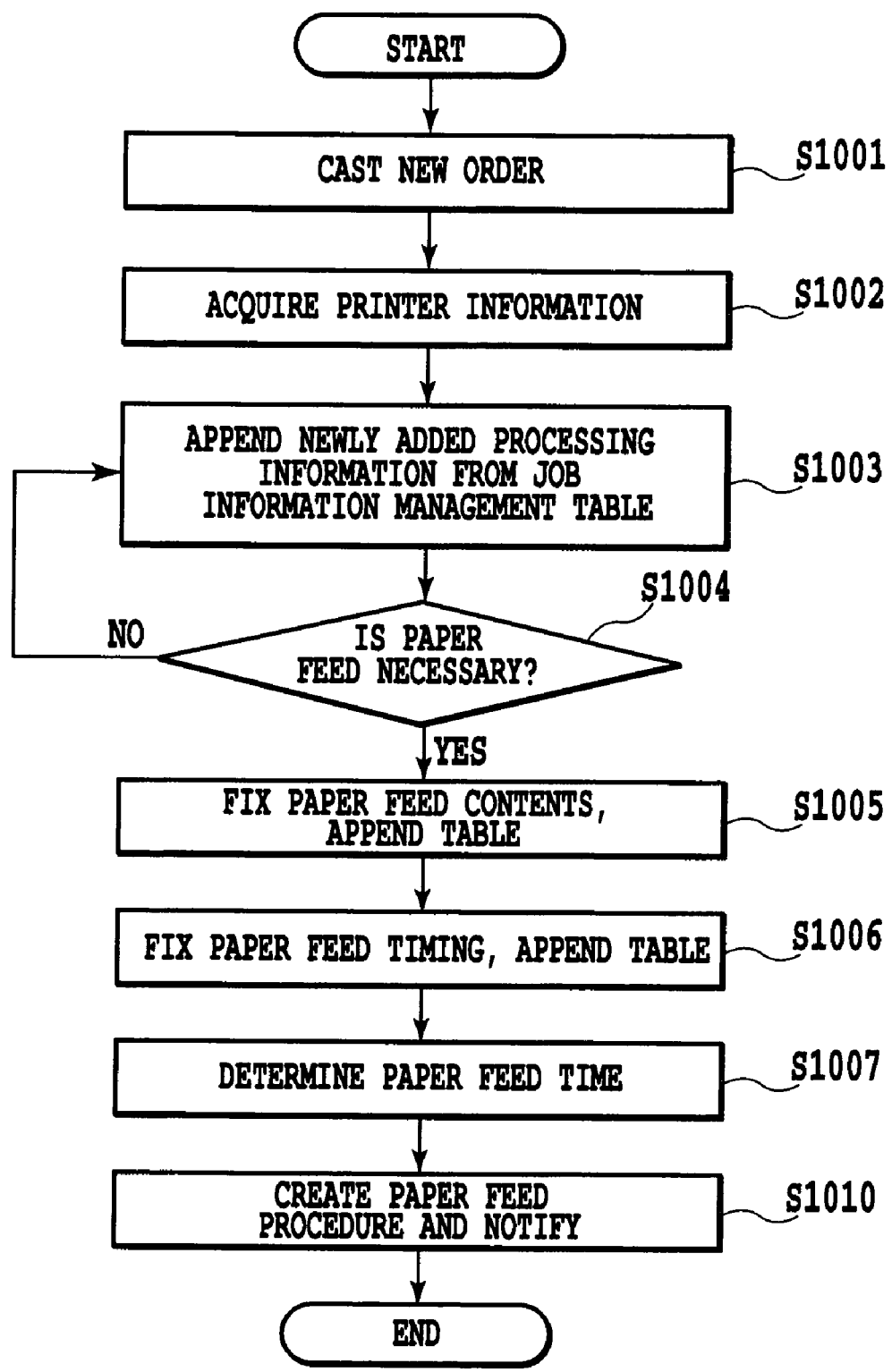
FIGS. 10A and 10B are flowcharts showing the contents of processing of a program of print server software according to Embodiment 1 to which this invention can be applied.
Figure 10B:
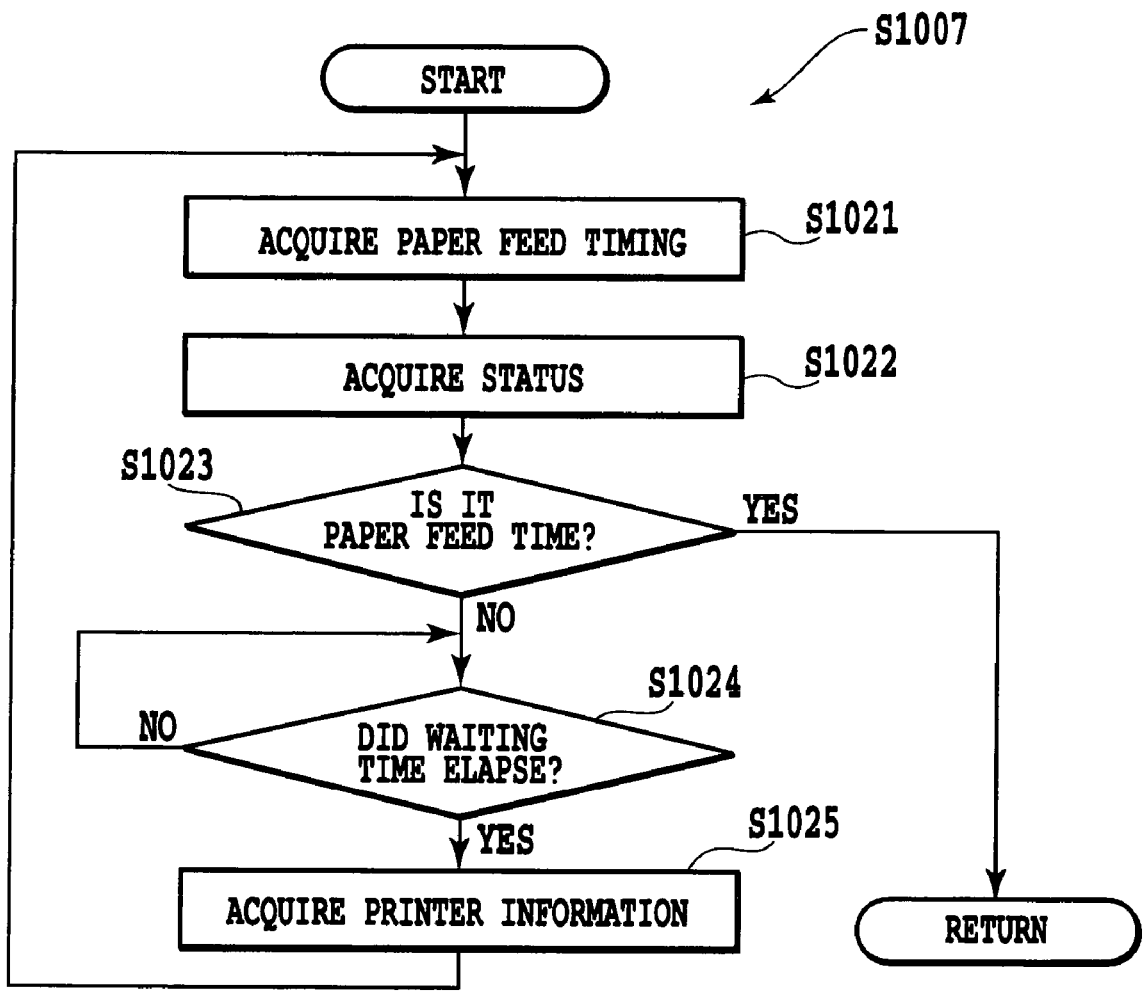

The processing procedure of the flowchart in FIGS. 10A and 10B shows the contents of processing of the program 403 of the print server software that the CPU 200 of the print server 105 executes. FIG. 10A shows the contents of processing of the job manager, and FIG. 10B shows paper feed time determining processing.

When the operator instructs printing of a desired order on the viewer of the work PC 106 and printing is started, the job manager 603 will detect that a new print processing instruction was issued in Step S1001 in FIG. 10A. Regarding a printing job being executed (printing job), a printing job waiting for which later execution is reserved, a printing job currently being halted due to interruption, etc. of each printer, the job manager 603 registers information about printing jobs in the job information management table (FIG. 12) held internally and manages it. The information about printing jobs includes "Job ID," "Document name," "Time accepted," "Output cassette serial number," "Number of output sheets (for one copy)," "Number of output copies," "Output paper size," etc. These pieces of information do not change with progress of print processing, but are fixed permanently when the job manager 603 detects that a print processing instruction is issued. The job manager 603 analyzes the print processing instruction newly issued, extracts information of the above-mentioned print processing for printers based on the print information, and stores it in the job information management table (FIG. 12). In an example of the job information management table in FIG. 12, jobs 1202 and 1203 are printing jobs newly put into print processing. The job manager 603 is capable of displaying the information of the jobs 1202 and 1203 on the operator's work PC 106 like a GUI shown in FIG. 11.

Figure 11:
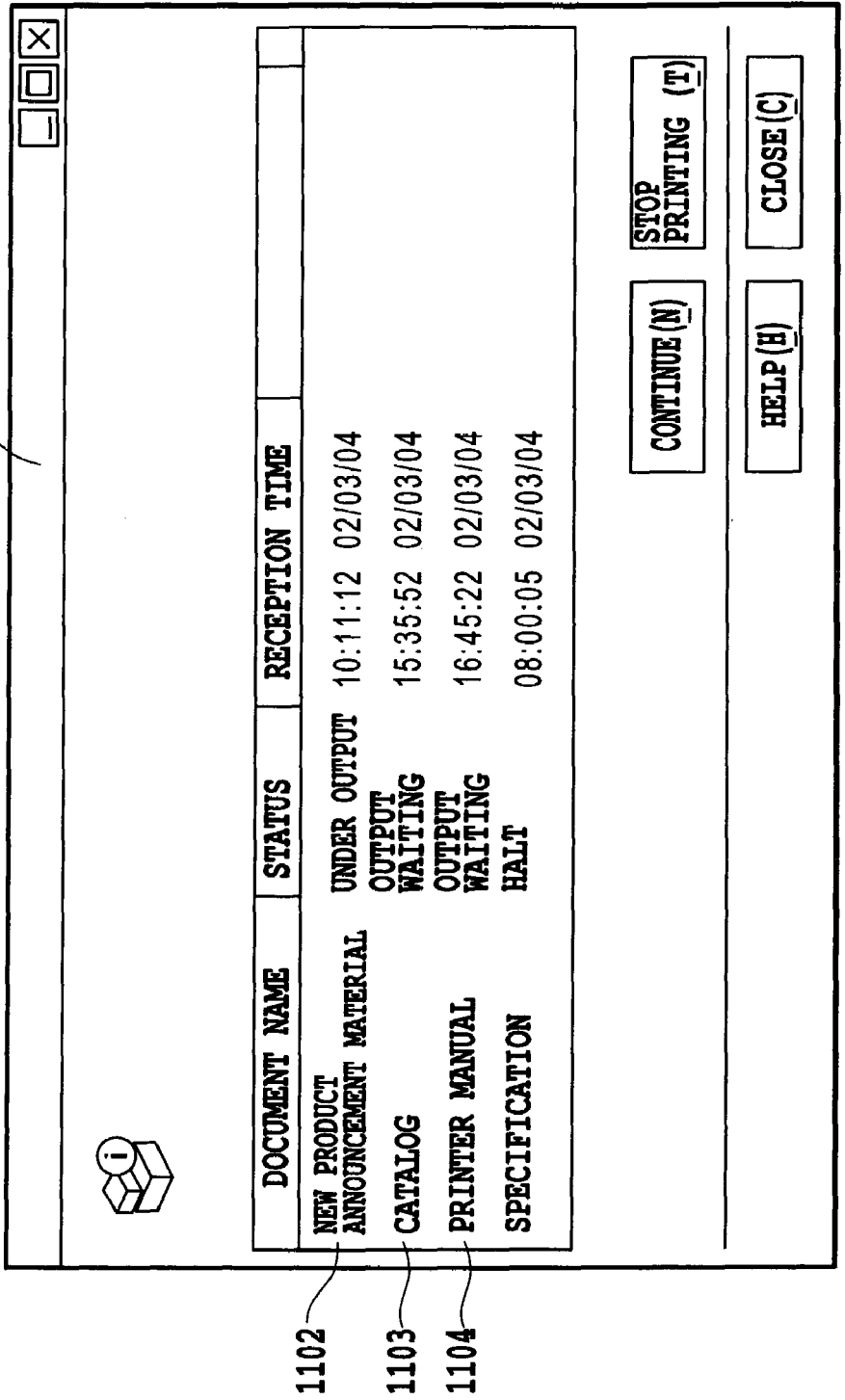
FIG. 11 is a diagram showing a GUI of job manager of Embodiment 1 to which this invention can be applied.

In Step S1002, the job manager 603 requests the device manager 604 of acquisition of device information (information of a printer based on the above-mentioned print processing instruction). In the course of explanation, it is assumed that a request of the job manager 603 for acquisition of the device information to the device manager 604 can be made at an arbitrary timing, and it is assumed in this embodiment that it is done, for example, after a new order is inputted. The device manager 604 that accepted the request communicates with the printer through a network, and acquires device information. The information acquired as device information is roughly divided into two. One is information about a printing job currently being executed by a printer (printing device), and includes Job ID whereby printing job is identified, a status of processing, a progress of the printing job (for example, the number of output sheets), etc. Another is information about the printer at that time, and includes the size of paper remaining in each cassette mounted on the printer, the number of sheets, etc. The device manager 604 that acquired device information notifies the job manager 603 of the acquired information. The job manager 603 that received the notification registers the contents of notification in the device information management table (FIG. 13) stored in the internally held HD 205. The job manager 603 explicitly displays a part of the information to the operator as in the form of "Status: output in progress" as illustrated in FIG. 11.

In Step S1003 to Step S1006, the job manager 603 refers to the job information management table and appends information about paper feed to the device information management table. First, in Step S1003, the job manager 603 refers to the "Job ID" and the "Output cassette ID" of a printing job that is newly appended to the job information management table. Then the job manager 603 appends "Job ID," "Number of output sheets," "Status," etc. to a line of an appropriate "Cassette ID" in the device information management table (FIG. 14). In this example, a job 1202 whose Job ID is 2 (the output cassette ID is 2) is currently not being printed. Consequently, the job manager 603 appends "Job ID=2" to an appropriate line of "Cassette ID=2" in the device information management table, and appends "0" and "Waiting" for "Number of output papers" and "Status," respectively.

In Step S1004, the job manager 603 determines whether paper feed is necessary for a target printer. For example, when referring to FIG. 12, a job 1202 with Job ID of 2 is a job that uses (50 sheets×20 copies=) 1000 sheets of B5 paper. When referring to FIG. 13, 2000 sheets of B5 paper remain in a cassette 2 of the paper feed source corresponding to it. Consequently, the job manager 603 determines that paper feed is unnecessary for printing of the job 1202. On the contrary, if the cassette 2 of the paper feed source shown in FIG. 13 has only less than 1000 sheets, the job manager 603 determines that paper feed is necessary for printing of the job 1202.

On the other hand, when referring to FIG. 12, a job 1203 with Job ID of 3 is a job that uses (50 sheets×10 copies=) 500 sheets of A4 paper. When referring to FIG. 13, the cassette 2 of the paper feed source corresponding to it is fed with A3 paper. Consequently, the job manager 603 determines that paper feed is necessary for printing of the job 1203.

When it is determined that paper feed is unnecessary in Step S1004, the job manager 603 returns to Step S1003. If there is information of a new print processing instruction that is not appended to the device information management table yet, the job manager 603 appends information of the newly appended printing job to the device information management table.

When it is determined in Step S1004 that paper feed is necessary, the job manager 603 fixes the contents of paper feed in Step S1005. For example, in order to execute the job 1203 with Job ID of 3, when referring to FIGS. 12 and 14 as described above, it is necessary to "remove A3 paper in a cassette 1 and feed 500 sheets of A4 paper in the cassette 1."

In Step S1005, the job manager 603 fixes concrete contents of paper feed like this referring to the tables in FIGS. 12 and 14. Then the job manager 603 appends information of the contents of paper feed to a line of an appropriate Job ID in the device information management table.

In the example in FIG. 14, "A4 paper, 500 sheets" is appended to the paper feed contents of "Job ID=3" in the line of "Cassette ID=1."

Moreover, when it is determined that paper feed is necessary in Step S1004, in Step S1006 the job manager 603 fixes a paper feed timing of the paper feed contents fixed in Step S1005, based on the contents of the device information management table (FIG. 13). In this example, when feeding paper to the cassette 1, the job manager 603 refers to the tables in FIGS. 12 and 14. In this case, the most efficient procedure is: "execution of a job 1201 with Job ID of 1 is not halted," "immediately after completion of the job 1202, printing of the job 1203 is started without stopping continuous print processing." Therefore, the job manager 603 determines that it is most efficient to "feed paper to the cassette 1 for the job 1203 after completion of the job 1201 with Job ID of 1." In Step S1006, the job manager 603 fixes concrete paper feed timing like this, and appends the paper feed timing information to a line of the appropriate Job ID in the device information management table. In the example in FIG. 14, "after completion of the job 1201 with Job ID of 1" is appended in the paper feed timing of "Job ID=3" in the line of "Cassette ID=1."

This Embodiment 1 features that in the processing in Step S1004 to Step S1006, necessity and contents of paper feed and a paper feed timing are fixed from a state of the current printer (number of remaining sheets etc.) and information of a printing job that is reserved to be executed in the future. By processing in Step S1003 to Step S1006 in the foregoing, the job manager 603 appends paper feed information to the device information management table.

Subsequently, in Step S1007, the job manager 603 conducts paper feed time determination processing. FIG. 10B is a flowchart of paper feed time determination processing in Step S1007.

In Step S1021 in FIG. 10B, the job manager 603 reads the paper feed timing of each job from the device information management table. For example, in a state of FIG. 14, the job manager 603 recognizes that the paper feed timing of the job 1203 with Job ID of 3 is "after completion of the job 1201 with Job ID of 1." Moreover, in Step S1022, the job manager 603 reads a status of relevant job stored at paper feed timing that is recognized from the device information management table. For example, in a state of FIG. 14, the job manager 603 recognizes that the job 1201 with Job ID of 1 is "Being executed."

In Step S1023, the job manager 603 determines whether this moment is the paper feed timing that was fixed in Step S1006 from results of Step S1021 and Step S1022. For example, in the state of FIG. 14, paper feed timing for the job 1203 with Job ID of 3 is "after completion of the job 1201 with Job ID of 1." Meanwhile, the job 1201 with Job ID of 1 is "Being executed." Because of these states, the job manager 603 determines that this moment is not the timing to conduct paper feed for the job 1203. On the contrary, when the status of the job 1201 with Job ID of 1 indicates "Completion," the job manager 603 determines that this moment is the timing to conduct paper feed for the job 1203, and returns to processing in FIG. 10A from processing in FIG. 10B.

In Step S1023, for example, when it is determined that it is not the timing when paper is fed for the job 1203, the job manager 603 makes the processing stand by (Step S1024). The reason of conducting this stand-by of the processing is that if the job manager 603 conducts printer information acquisition in Step S1025 that will follow this too frequently, an overall operation of the system is liable to become slow due to a problem of network load etc. The system may be configured so that the operator is enabled to set a time interval to wait etc. from the work PC 106 etc. for the system.

After waiting of the processing in Step S1024, the job manager 603 acquires device information (information of printers based on a print processing instruction) in Step S1025. This is exactly the same processing as the above-mentioned Step S1002; the job manager 603 updates the device information management table that the job manager 603 holds using device information acquired from the device manager 604. After that, the job manager 603 returns to processing of Step S1021, and determines paper feed timing.

When it is determined in Step S1007 in FIG. 10A that this moment is the timing to conduct paper feed, in Step 1010 in FIG. 10A the job manager 603 creates a paper feed procedures manual based on information of "Contents of paper feed," "Paper feed timing," etc. in the device information management table. The job manager 603 notifies it to the work PC 106. The work PC 106 displays the contents of the paper feed procedures manual that was notified on its viewer. In the example in FIG. 14, when a status of the job 1201 with Job ID of 1 is "Completion," the job manager 603 determines that this moment is the timing to conduct paper feed for the job 1203. Consequently, the job manager 603 creates a paper feed procedures manual based on "ID of a printer based on a print processing instruction," "Cassette ID=1," and paper feed contents of the "Job ID=3" i.e., "A4 paper, 500 sheets," etc. FIG. 15 is one example of the display contents on the work PC 106. The operator conducts an actual paper feed work based on this paper feed procedures manual displayed on the work PC 106. In the case of a complicated paper feed procedure, it is advisable that the operator prints a displayed paper feed procedures manual and checks the printed document.

Embodiment 2

Hereafter, Embodiment 2 that is based on Embodiment 1 described above will be described. In Embodiment 1 described above, for a single printer equipped with a plurality of sheet feeders, processing of fixing and notifying the paper feed procedure for the printer and its timing was explained. This Embodiment 2 is almost basically the same as Embodiment 1 described above in terms of the equipment configuration and operation contents. What is different in Embodiment 2 is that for a plurality of printers each equipped with a plurality of sheet feeders, the job manager 603 and the device manager 604 feed papers to the printers in cooperation, and fix and notify its timing. A description will be given for processing of fixation and notification.

Figure 16B:
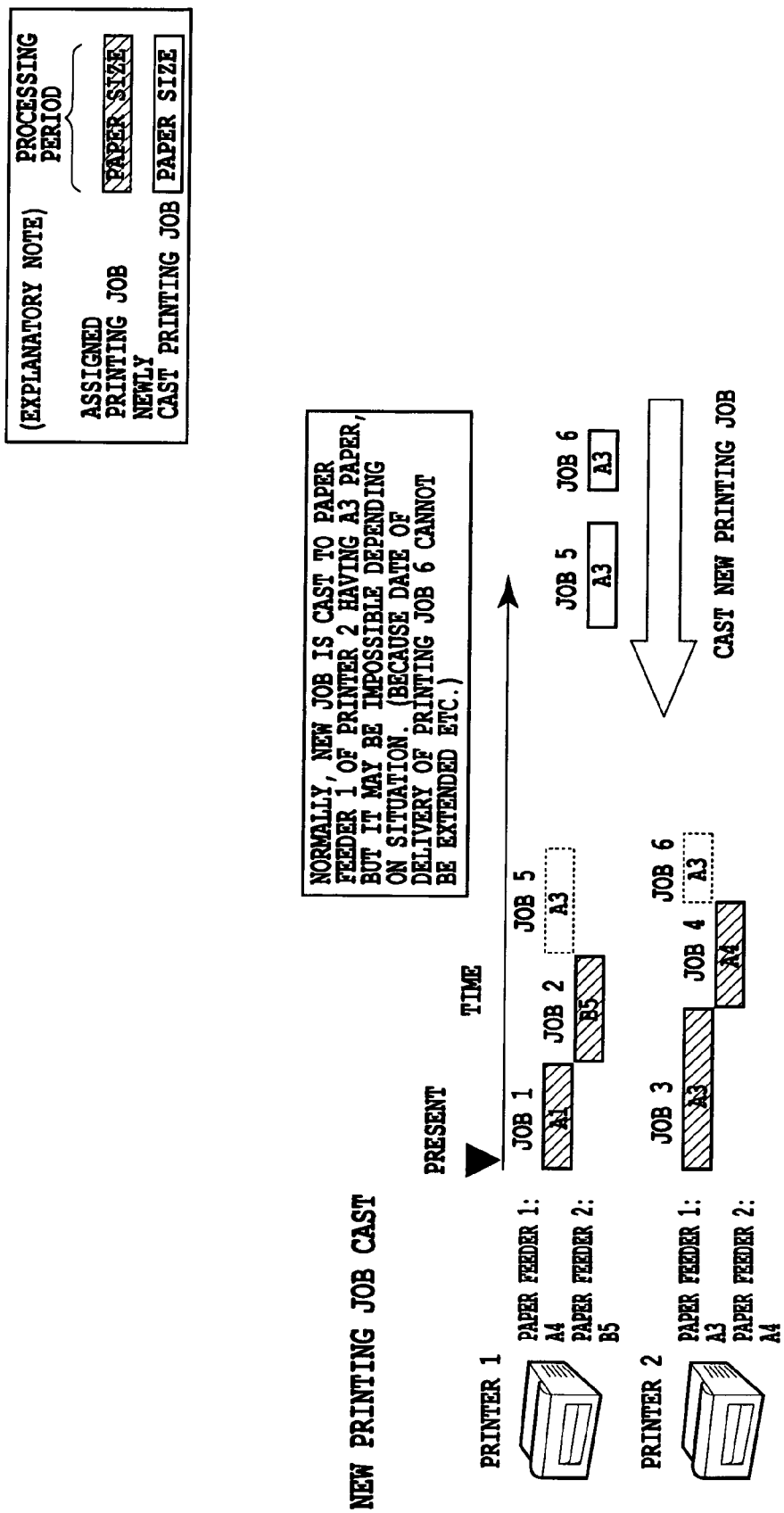

FIGS. 16A to 16D are schematic diagrams for explaining briefly this Embodiment 2 in which a paper feed procedure to a plurality of printers each equipped with a plurality of sheet feeders and its timing are fixed and notified. FIGS. 16A to 16D are diagrams showing timing as follows: FIG. 16A is for execution of assigned printing jobs, FIG. 16B for a new printing job being cast, FIG. 16C for new printing job assignment and conventional timing of paper feed, and FIG. 16D for new printing job assignment and notification of paper feed timing of Embodiment 2. In FIG. 16A, printing job 1 is being executed using the sheet feeder (cassette) 1 in printing device (printer) 1, and a printing job 2 is assigned to a sheet feeder 2 thereof as the next printing job. The sheet feeders 1, 2 of the printer 1 are fed with A4 paper and B5 paper that are necessary for printing jobs, respectively. On the other hand, in the printer 2, a printing job 3 is being executed using the sheet feeder 1, and printing job 4 as the next printing job is assigned to the printer using the sheet feeder 2. Necessary A3 and A4 papers are fed to the sheet feeders 1, 2 of the printer 2.

Suppose that a printing job 5 and a printing job 6 as new printing jobs are assigned to the job manager 603, as shown in FIG. 16B, following the state in FIG. 16A. Here, the figures shows a case where the printing job 5 is assigned to the sheet feeder 1 of the printer 1, and the printing job 6 is assigned to the sheet feeder 1 of the printer 2. Incidentally, to which printer a printing job should be assigned is determined from states of the plurality of printing jobs and states of the plurality of printers by the job manager 603 and the device manager 604 that work in cooperation. This condition occurs due to, for example, a fact that a date of delivery of the printing job 6 can not be stretched out or the like. Because this is not directly related to this Embodiment 2, its detailed explanation will be omitted.

Here, with reference to FIG. 16C following a state in FIG. 16B, what problem will occur in the conventional processing method to which this embodiment is not applied will be described. When referring to FIG. 16C, paper run-out occurs at a point when the printer 1 completes the printing job 2 after going through the printing job 1 and the printing job 2. That is, since A4 paper that the printing job 1 used is kept in the sheet feeder 1, the printing job 5 that uses A3 paper cannot be executed as it is. In this case, the operator is notified of paper run-out at the time of occurrence of paper run-out, and the operator who saw the state feeds A3 paper to the sheet feeder 1 of the printer 1. In this situation, the printing job 4 is being executed in the printer 2.

Figure 16C:
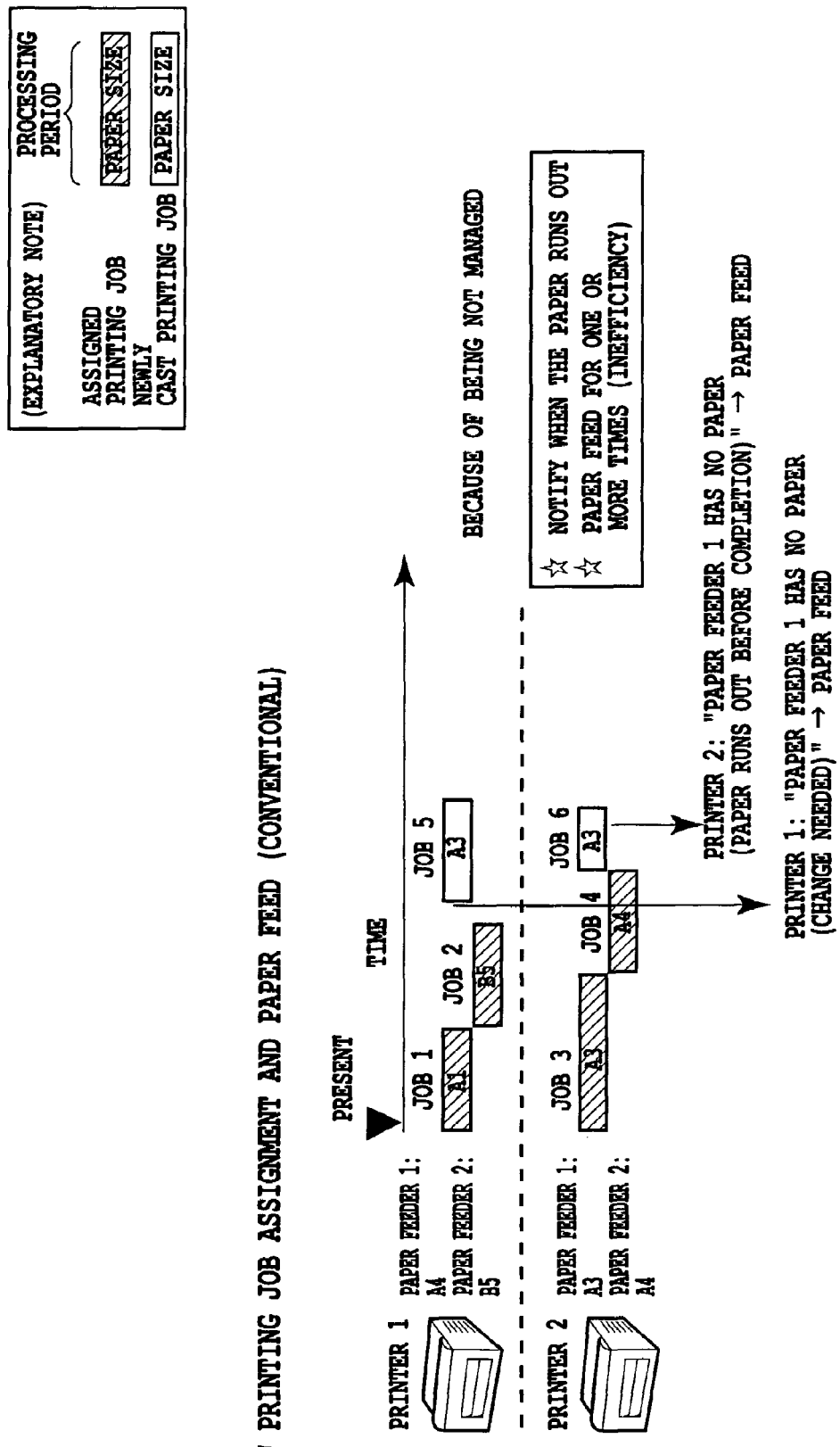

In FIG. 16C, the operator who finished paper feed to the sheet feeder 1 of the printer 1 returns to his/her position, and stands by. However, there may be a case where at the point of completion of the printing job 4 with the printer 2, paper run-out occurs in the sheet feeder 1 thereof. That is, when all sheets of A3 paper in the sheet feeder 1 of the printer 2 have been used in the printing job 3, there occurs a situation where the printing job 6 that uses A3 paper cannot be executed as it is. In this case, the operator is notified of paper run-out at the time of occurrence of paper run-out, and the operator who saw the state feeds A3 paper to the sheet feeder 1 of the printer 2. In this way, since in the conventional method, each time paper runs out an instruction of paper feed is issued to the operator, it is inefficient.

Figure 16D:
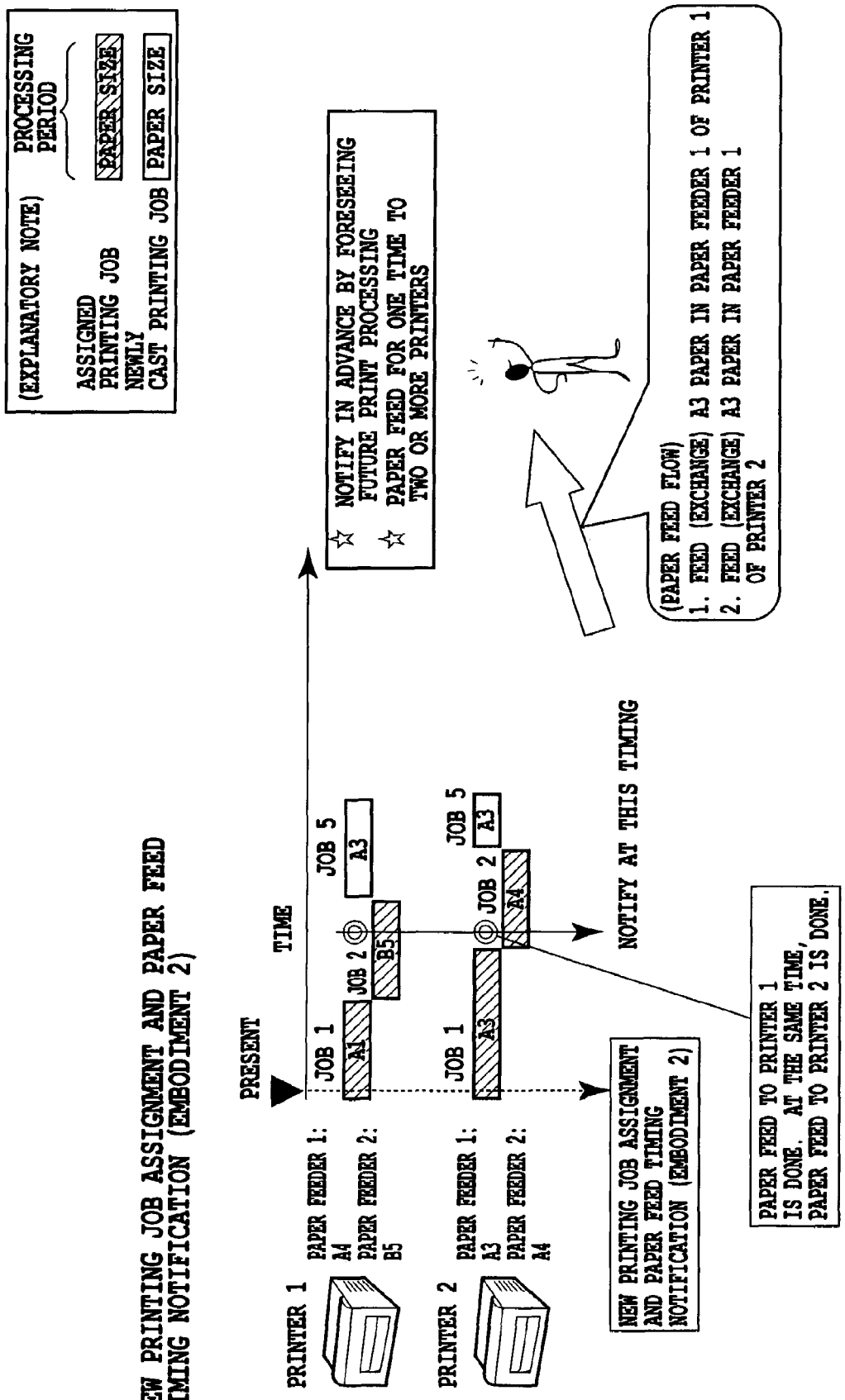

How the problem associated with the conventional processing method described above is solved by this Embodiment 2 will be described with reference to FIG. 16D. First, a time of feeding A3 paper that the printing job 5 in the printer 1 uses is considered. The sheet feeder 1 that the printing job 5 uses cannot be fed with A5 paper when the printing job 1 is being executed. Therefore, it is reasonable to feed paper to the printer 1 at a point when the printing job 1 is completed. Next, a time of feeding A3 paper that the printing job 6 in the printer 2 uses is considered. It is reasonable to feed paper at a point when the printing job 3 is completed for the same reason as that of the above-mentioned printer 1.

Here, paper feed times to the two printers described above are compared with reference to FIG. 16D. The comparison shows that even if the paper feed time of A3 paper that the printing job 5 in the above-mentioned printer 1 uses is stretched out so that it becomes the same time as the paper feed time of A3 paper that the printing job 6 in the printer 2 uses, there occurs no problem at all. That is, referring to FIG. 16D, the paper feed time of A3 paper that the printing job 5 in the printer 1 uses may be anytime as long as it falls on an execution time of the printing job 2 using other sheet feeder that is not a target of paper feed. Similarly, the paper feed time of A3 paper that the printing job 6 in the printer 2 uses may be anytime as long as it falls on an execution time of the printing job 4 using other sheet feeder that is not a target of paper feed. If this is considered, as shown in FIG. 16D, regarding paper feed time of A3 paper that the printing job 5 uses and the paper feed time of A3 paper that the printing job 6 uses, the operator can be notified of paper feed at one time during execution of both the printing job 2 and the printing job 4. Since the operator who received the notification can finish paper feed at once for the printer 1 and the printer 2, it is efficient.

FIG. 17 is a diagram showing one example of the job information management table that is used in this Embodiment 2 and whereby information of a printing job is managed. As a different point from the above-mentioned Embodiment 1, output device (printing device) ID, start time, and completion time of each printing job are appended to the table. These pieces of information are information that is necessary for synchronizing paper feed times described above.

FIGS. 18A and 18B are diagrams showing one example of a device information management table whereby the number of remaining paper sheets and a state of an assigned printing job are managed for the printer 1 and the printer 2 that are used in this Embodiment 2. FIG. 18A is the device information management table of the printer 1; FIG. 18B is the device information management table of the printer 2.

In Embodiment 1 described above, since the number of printers was one, the number of the device information management tables was also one. However, since this Embodiment 2 treats a plurality of printers, a device information management table is assigned to each printer on a one-by-one basis.

Hereafter, for a plurality of printers each equipped with a plurality of sheet feeders, processing that the job manager 603 and the device manager 604 in cooperation together fix and notify a paper feed procedure with timing to the printers will be described. The processing pertaining to operation explanation of this Embodiment 2 is executed by a processing procedure as in the flowchart in FIG. 17 to 19B and tables.

Figure 19A:
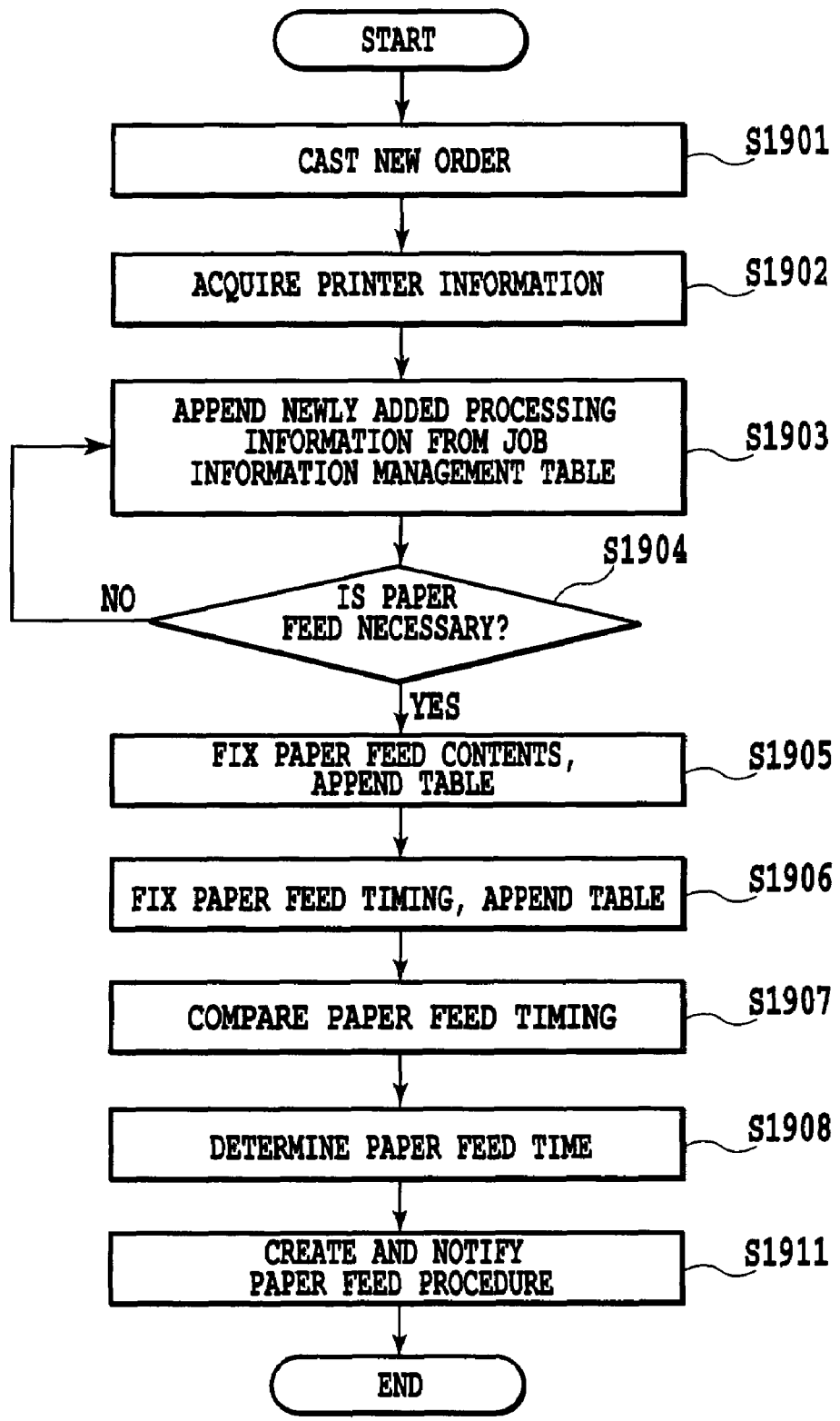
FIGS. 19A and 19B are flowcharts showing the contents of processing of a program of the print server software of Embodiment 2 to which this invention can be applied.
Figure 19B:
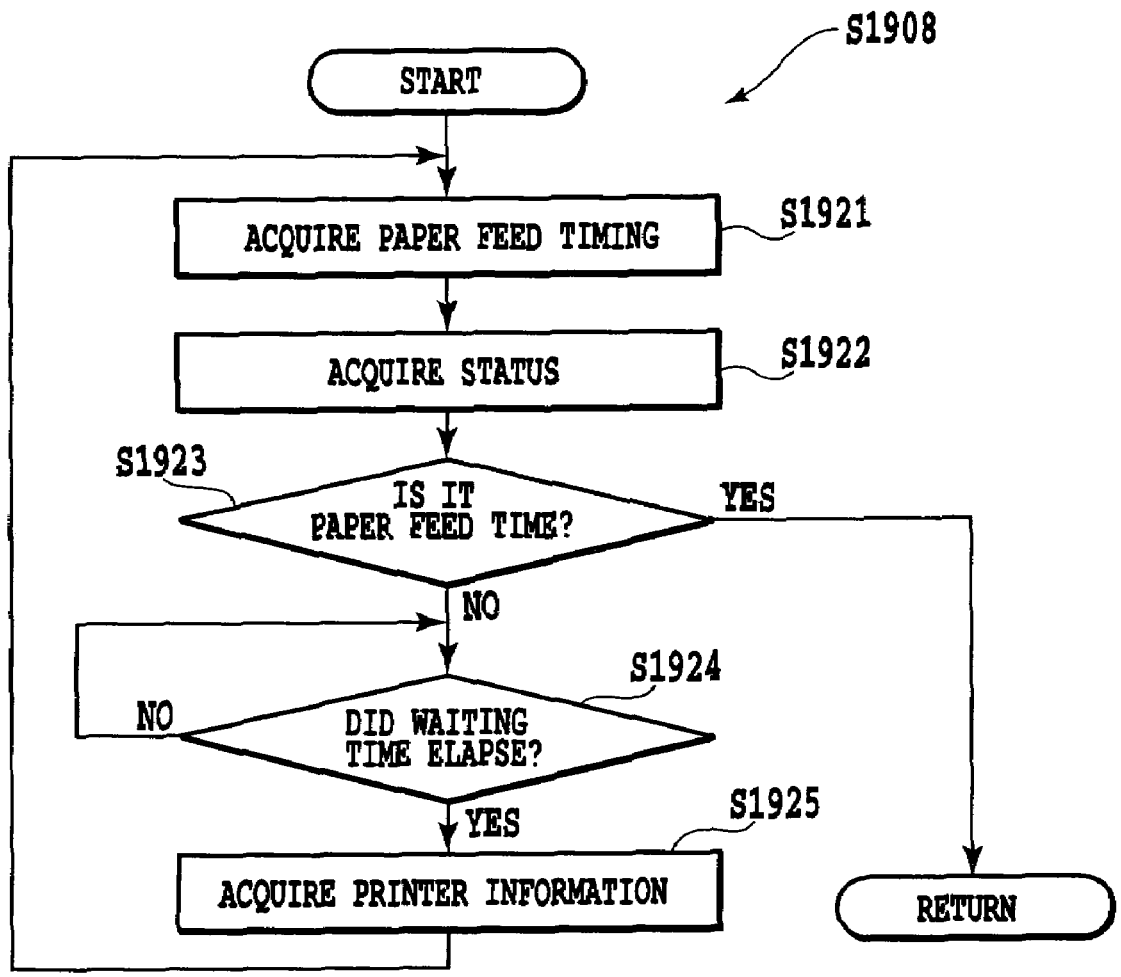

The processing procedures of the flowchart in FIGS. 19A and 19B show the contents of processing of the program 403 of the print server software that the CPU 200 of the print server 105 executes. FIG. 19A is a diagram showing the contents of processing of the job manager; FIG. 19B is a diagram showing paper feed time determination processing. This processing procedure is based on the processing procedure of Embodiment 1 described above. Based on this, processing procedure peculiar to this Embodiment 2 will be described in detail below.

When the operator instructs printing of a desired order on the viewer of the work PC 106 to start the printing, in Step S1901 in FIG. 19A the job manager 603 detects new issuance of a print processing instruction. Regarding a printing job being executed (printing job), a printing job waiting for which later execution is reserved, a printing job currently being halted due to interruption etc., and the like, the job manager 603 registers and manages information about the printing job in the job information management table held internally (FIG. 17). Information about a printing job includes "Job ID," "Document name," "Time accepted," "Output device ID," "Output cassette number," "Number of output sheets (for one copy)," "Number of output copies," "Output paper size," "Start time," "Completion time," etc. The job manager 603 analyzes the print processing instruction newly issued, extracts information of the above-mentioned printing job for a printer based on the print information, and stores the information in the job information management table (FIG. 17).

When a new printing job is cast in Step S1901, it is necessary for the job manager 603 to store the start time and the completion time of the printing job in the job information management table. Here, a way of assigning a printing job to a printer most efficiently is determined by a plurality of printing jobs and states of printers (as described above with reference to FIGS. 16A to 16D, for example, a date of delivery of the printing job 6 cannot be stretched out, etc.). Since this problem does not have direct relation to Embodiment 2, detailed explanation will be omitted. It is hard to obtain a correct value of a time to elapse before a printing job is completed because it is governed not only by the capacity of a printer but also by a format of data to be printed (whether it is a text or an image). Consequently, the job manager 603 applies a method of predicting a target print processing time using an existing technique, such as a gazette of Japanese Patent Application Laid-open No. 2002-262006, for predicting a time to elapse before printing is completed through application of past print history. The job manager 603 calculates predicted start time and completion time of the target printing job from a print processing time obtained by this prediction method, a predicted completion time of the latest printing job in a printer to which the target printing job was assigned, etc. In the example of the job information management table in FIG. 17, the printing jobs 1 to 6 described above with reference to FIG. 16A to 16D are registered as jobs whose Job IDs are ID1 to 6, respectively.

In Step S1902, the job manager 603 registers information in the device information management table (FIG. 18A, 18B). Step S1902 is the same processing as that of Step S1002 of Embodiment 1. This is processing in Step S1902: the job manager 603 acquires states of printers (number of remaining sheets etc.) from the device manager 604 and stores it in the device information management table that corresponds to the printer and is held by the job manager 603. In Step S1902 of Embodiment 2, the job manager 603 conducts the same processing as Step S1002 of Embodiment 1 for all printers.

In Step S1903 to Step S1906, the job manager 603 appends information about paper feed to the device information management table, as with Step S1003 to Step S1006 of Embodiment 1.

In Step S1903, the job manager 603 writes the information about a printing job in the device information management table of the printer 1 as in the example in FIG. 18A. Then the job manager 603 determines whether paper feed is necessary for the printer 1 in Step 1904. In the example of FIG. 18A, the printing job 5 needs paper feed. That is, when referring to FIG. 17, the printing job 5 is a job that uses (30 sheets×20 copies=) 600 sheets of A3 paper, and when referring to FIG. 18A, A4 paper is fed to the cassette 1 of the paper feed source that corresponds to the printing job 5. Therefore, the job manager 603 determines that paper feed is necessary for printing of the printing job 5. Consequently, in Step S1905, the job manager 603 appends the contents of paper feed in the device information management table, in such away as "A3 paper, 600 sheets." Moreover, in Step S1906, the job manager 603 appends the paper feed timing to the device information management table. In this occasion, as a point different from Embodiment 1, the job manager 603 makes description that allows a margin using "Start time" and "Completion time" of the job information management table, in such a way as "From 10:10:10 (hour: minute: second) to 11:11:11." In this example, the job manager 603 determines, as a result of reference of the tables in FIGS. 17 and 18A, that paper feed may be done in a period between the completion time of the printing job 1 and the completion time of the printing job 2, i.e., "From 10:10:10 to 11:11:11." The job manager 603 writes the timing in the device information management table.

In Step S1903 to S1906, the job manager 603 appends paper feed information to the device information management table of the printer 2 similarly.

In Step S1903, the job manager 603 writes the information about a printing job in the device information management table of the printer 2, like the example in FIG. 18B. Then, in Step S1904, the job manager 603 determines whether paper feed is necessary in the printer 2. In the example of FIG. 18B, the printing job 6 needs paper feed. That is, when referring to FIG. 17, the printing job 6 is a job that uses (100 sheets×10 copies=) 1000 sheets of A3 paper, and when referring to FIG. 18B, only 400 sheets of A3 paper remain in the cassette 1 of the paper feed source corresponding to the printing job 6 at this moment. Consequently, the job manager 603 determines that paper feed is necessary for printing of the printing job 6. Consequently, in Step S1905, the job manager 603 appends the contents of paper feed to the device information management table, in such a way as "A3 paper, 1000 sheets." Moreover, in Step S1906, the job manager 603 appends the paper feed timing to the device information management table. In this example, the job manager 603 determines, as a result of reference of the tables in FIGS. 17 and 18B, that paper feed may be conducted in a period between the completion time of the printing job 3 and the completion time of the printing job 4, i.e., "From 10:20:30 to 12:12:12." Then the job manager 603 writes the timing in the device information management table.

Step S1907 is processing peculiar to this Embodiment 2. In Step S1907, the job manager 603 compares paper feed information stored in the device information management tables of the printers. When referring to FIGS. 18A and 18B, paper feed that becomes necessary in the printing job 5 in the printer 1 is paper feed in which "A3 paper, 600 sheets" are fed in a time "From 10:10:10 to 11:11:11." Moreover, paper feed that becomes necessary in the printing job 6 in the printer 2 is paper feed in which "A3 paper, 1000 sheets" are fed in a time "From 10:20:30 to 12:12:12." The job manager 603 compares these paper feed timings, and determines that they overlap at a time "From 10:20:30 to 11:11:11." Therefore, the job manager 603 determines that if paper feed notification is issued once in a time "From 10:20:30 to 11:11:11," the operator can be urged to execute both the printing job 5 in the printer 1 and the printing job 6 in the printer 2. As a result, the job manager 603 rewrites the paper feed timings that will be necessary in the printing job 5 and the printing job 6, respectively, in the device information management tables of the printer 1 and the printer 2 to a time "From 10:20:30 to 11:11:11."

Subsequently, in Step S1908, the job manager 603 conducts paper feed time determination processing. FIG. 19B is a flowchart of the paper feed time determination processing in Step S1908. Processing in FIG. 19B is basically loop processing of determining whether the same paper feed time as that of Embodiment 1 has come.

In Step 1921 in FIG. 19B, the job manager 603 reads the paper feed timing of each job from the device information management table. For example, the job manager 603 refers to the device information management table with paper feed timings rewritten in Step S1908 after the states of FIGS. 18A and 18B. Then the job manager 603 recognizes that the paper feed timing of both the printing job 5 with Job ID of 5 and the printing job 6 with Job ID of 6 are "During the period of 10:20:30 to 11:11:11."

Moreover, in Step 1922, the job manager 603 acquires Job ID of a printing job (in this example, acquiring Job ID of 3) that is to be completed at the earliest time (in this example, at 10:20:30) among the recognized paper feed timings by referring to the job information management table in FIG. 17. The job manager 603 reads a status of the printing job from the device information management table. For example, in a state after FIG. 18B the job manager 603 recognizes that the printing job with Job ID of 3 is "Completion." Furthermore, in Step 1922, the job manager 603 acquires the present time from the system.

In Step 1923, the job manager 603 determines whether this moment is the paper feed timing from results of Step 1921 and Step 1922. For example, in the case of the example described above, suppose that this moment is the recognized paper feed timing, i.e., "During the period of 10:20:30 to 11:11:11" and the printing job 3 is "Completion." In this case, the job manager 603 determines that this moment is the timing to conduct paper feed of the printing job 5 and the printing job 6, and returns to processing in FIG. 19A from processing in FIG. 19B.

In Step 1923, when it is determined that this moment is not the timing to conduct paper feed, the job manager 603 makes the processing stand by (Step S1924). The system may be configured so that the operator is enabled to set a time interval to wait etc. from the work PC 106 etc. for the system.

After standing by the processing in Step S1924, the job manager 603 acquires device information (information of printers based on a print processing instruction) in Step S1925. This is exactly the same processing as the above-mentioned Step S1902; the job manager 603 updates the device information management table that the job manager 603 holds using device information acquired from the device manager 604. After that, the job manager 603 returns to the processing in Step S1921, and determines paper feed timing.

Incidentally, in Step S1923, the job manager 603 considers the number of remaining sheets of the printer (for example, the printing job 3 is likely to come across paper run-out, etc.) and the progress in actual processing of the printer (for example, the completion time of the printing job 3 is likely to go over etc.). As a result, the job manager 603 assumes "During the period of 10:20:30 to 11:11:11 and also "when the printing job 3 is completed actually" as a time of paper feed. However, the job manager 603 may assume simply the earliest time "During the period of 10:20:30 to 11:11:11" stored in "Paper feed timing" in the device information management table as a paper feed time, without determining whether the printing job 3 is "Completion" in Step S1923. This corresponds to "Notifying at this timing" in FIG. 16D.

Suppose that this moment is determined to be the timing to conduct paper feed in Step S1908 in FIG. 19A. In this case, in Step S1911 in FIG. 19A, the job manager 603 creates a paper feed procedures manual based on information of "Paper feed contents" etc. in the device information management table in the same manner as Step S1010 of Embodiment 1. The job manager 603 notifies it to the work PC 106. The work PC 106 displays the contents of the paper feed procedures manual that was notified on its viewer. In the example described above, the job managers 603 refers to the device information management table on which the paper feed timings of the printing job 5 and the printing job 6 were both rewritten to "During the period of 10:20:30 to 11:11:11" in Step S1908 after the states of FIGS. 18A and 18B. The job manager 603 creates a paper feed procedures manual that urges paper feed for the printing job 5 and the printing job 6 at a time. The operator conducts an actual paper feed operation based on this paper feed procedures manual displayed on the work PC 106. By the above configuration, also when a plurality of printers are used, the processing of paper feed can be made efficient.

[Effect of the Embodiments 1, 2]

As described in the foregoing, according to the present embodiments 1, 2, paper run-out of the printers can be reduced and printing can be executed efficiently without halting a printing job. Moreover, since the operator's round trips to the printer for paper feed is reduced in number, the operator can concentrate on other more important operations. Furthermore, since the operator only has to conduct the processing as directions of paper feed times and the paper feed procedure, it is not necessary for the operator to keep paper feed in mind, which reduces paper feed mistakes.

Other Embodiments

The above-mentioned embodiments 1, 2 to which this invention can be applied have variations as follows as examples. A storage medium (or recording medium) that stores a program code of the software for realizing the functions of the above-mentioned embodiments is supplied to a system or equipment. It is needless to say that in this case, the embodiments 1, 2 described above are achieved by a computer (or CPU or MPU (MicroProcessor Unit)) of the system or equipment reading and executing the program code stored in the storage medium.

Since in this case, the program code itself read from the storage medium will achieve the functions of the above-mentioned embodiments, the storage medium storing the program code will constitute this invention. Moreover, other than the case where the functions of the above-mentioned embodiments are achieved by the computer executing the program code read out thereby, an operating system (OS) working on the computer or the like may execute a part of or the whole actual processing based on instructions of the program code. It is natural that the configuration of this invention includes the case where the functions of the above-mentioned embodiments are achieved by that processing.

In addition, this invention may adopt the following case: a program code read from a storage medium is written in a storage medium provided in a function expansion card inserted into the computer or a function expansion unit connected to the computer, and subsequently based on instructions of the program code, a CPU or the like provided in the function expansion card or the function expansion unit executes a part of or the whole actual processing. It goes without saying that the configuration of this invention includes the case where the functions of the embodiments described above are achieved by that processing.

Moreover, in this invention, a program code of software that achieves the functions of the above-mentioned embodiments may be stored, by being distributed through a network, in a storage medium, such as a hard disk, memory, etc. of a system or equipment, or a storage medium, such as CD-RW (CD-Rewritable), CD-R (CD Recordable), etc. It is needles to say that the above-mentioned embodiments are achieved by the computer (or CPU or MPU) of the system or equipment reading and executing a program code stored in the storage unit or a storage medium.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

This application claims priority from Japanese Patent Application No. 2004-174687 filed Jun. 11, 2004, which is hereby incorporated by reference herein.

What is claimed is:

1. A print control apparatus that communicates with a first printing apparatus and a second printing apparatus. comprising:
   a deciding unit adapted to decide (i) a first sheet supplying period in the first printing apparatus based on a first print job to be processed by the first printing apparatus and device information of the first printing apparatus and (ii) a second sheet supplying period in the second printing apparatus based on a second print job to be processed by the second printing apparatus and device information of the second printing apparatus. wherein the first and second sheet supplying periods have a start time and a completion time:
   a specifying unit adapted to specify a common sheet supplying period in the first and second printing apparatuses. wherein the common sheet supplying period is period to overlap in the first and second sheet supplying periods decided by said deciding unit: and
   a notifying unit adapted to notify an instruction to supply the first and second printing apparatuses with a sheet by using the common sheet setting period specified by said specifying unit,
   wherein said specifying unit specifies the common sheet supplying period to be able to supply the sheet without halting a printing processing in the first and second printing apparatuses, and
   where in the deciding unit decides the earliest time in the overlapping period as a common sheet supplying time.

2. The print control apparatus according to claim 1, wherein the notifying unit notifies said instruction when it is determined that the current time is the common sheet supplying time.

3. A print controlling method of print control apparatus that communicates with a first printing apparatus and a second printing apparatus, the print controlling method comprising:
   a deciding step of deciding (i) a first sheet supplying period in the first printing apparatus based on a first print job to be processed by the first printing apparatus and device information of the first printing apparatus and (ii) a second sheet supplying period in the second printing apparatus based on a second print job to be processed by the second printing apparatus and device information of the second printing apparatus, wherein the first and second sheet supplying periods have a start time and a completion time;
   a specifying step of specifying a common sheet supplying period in the first and second printing apparatuses, wherein the common sheet supplying period is a period to overlap in the first and second sheet supplying periods decided by said deciding step; and
   a notifying step of notifying an instruction to supply the first and second printing apparatuses with a sheet by using the common sheet supplying period specified by said specifying step,
   wherein said specifying step specifies the common sheet supplying period to be able to supply the sheet without halting printing processing in the first and second printing apparatuses, and
   wherein the deciding step decides the earliest time in the overlapping period as a common sheet supplying time.

4. A computer-readable storage medium which stores a program for making a computer execute a print controlling method for a print control apparatus that communicates with a first printing apparatus and a second printing apparatus, the method comprising:
   a deciding step of deciding (i) a first sheet supplying period in the first printing apparatus based on a first print job to be processed by the first printing apparatus and device information of the first printing apparatus and (ii) a second sheet supplying period in the second printing apparatus based on a second print job to be processed by the second printing apparatus and device information of the second printing apparatus, wherein the first and second sheet supplying periods have a start time and completion time;
   a specifying step of specifying a common sheet supplying period in the first and second printing apparatuses, wherein the common sheet supplying period is a period to overlap in the first and second sheet supplying periods decided in said deciding step; and
   a notifying step of notifying an instruction to supply the first and second printing apparatuses with a sheet by using the common sheet supplying period specified in said specifying step,
   wherein said specifying step specifies the common sheet supplying period to be able to supply the sheet without halting printing processing in the first and second printing apparatuses, wherein the deciding step decides the earliest time in the overlapping period as a common sheet supplying time.

* * * * *